(12) United States Patent
Lim

(10) Patent No.: US 6,618,047 B1
(45) Date of Patent: *Sep. 9, 2003

(54) VISIBILITY CALCULATIONS FOR 3D COMPUTER GRAPHICS

(75) Inventor: Hong Lip Lim, Singapore (SG)

(73) Assignee: Fuzzysharp Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 09/490,288

(22) Filed: Jan. 20, 2000

Related U.S. Application Data

(63) Continuation of application No. 08/935,150, filed on Sep. 22, 1997, now Pat. No. 6,172,679, which is a continuation of application No. 08/182,096, filed as application No. PCT/AU92/00302 on Jun. 19, 1992, now Pat. No. 5,914,721.

(30) Foreign Application Priority Data

| Oct. 1, 1991 | (AU) | PK8643 |
| Oct. 1, 1991 | (AU) | PK8645 |
| Oct. 30, 1991 | (AU) | PK9218 |
| Jul. 19, 1991 | (AU) | PK7305 |
| Jun. 28, 1991 | (AU) | PK6942 |

(51) Int. Cl.[7] .................................. G06T 15/40
(52) U.S. Cl. ........................ 345/421; 345/422
(58) Field of Search .................. 345/419, 421, 345/425, 114, 139, 422, 418, 424

(56) References Cited

U.S. PATENT DOCUMENTS

| 4,594,673 A | * | 6/1986 | Holly ........................ 345/421 |
| 4,625,289 A | * | 11/1986 | Rockwood .................. 345/422 |
| 4,697,178 A | | 9/1987 | Heckel |
| 4,819,192 A | | 4/1989 | Kuragano et al. |
| 4,825,391 A | * | 4/1989 | Merz |
| 4,855,938 A | * | 8/1989 | Gonzalez-Lopez et al. . 345/422 |

(List continued on next page.)

FOREIGN PATENT DOCUMENTS

| EP | 193151 A | 9/1986 |
| EP | 0 481 581 | 4/1992 |
| GB | 2 228 850 | 9/1990 |

OTHER PUBLICATIONS

"Stabbing Isothetic Boxes & Rectangles ini O(n lg n) time", M. Hohmeyer S. J. Teller, 1991.*

(List continued on next page.)

*Primary Examiner*—Jeffery Brier
(74) *Attorney, Agent, or Firm*—Fish & Richardson P.C.

(57) ABSTRACT

Disclosed is a method of reducing the complexity of hidden surface removal in 3D graphics systems. A fuzzy projection (FF) of a surface (SU) as seen from a number of viewpoints (VP) in a bounding box (BB) is stored in a buffer (FA) having elements (FE). A combination of all the patches (PT) of the surface (SU) viewed form a fuzzy region (FR) where surfaces can be either visible, hidden, or unable to be determined with certainty as to whether or not visible/hidden. A non-fuzzy region (NF) describes those patches (PT) that are always visible.

68 Claims, 16 Drawing Sheets

U.S. PATENT DOCUMENTS

| | | | |
|---|---|---|---|
| 4,901,252 A | | 2/1990 | Fitzgerald et al. |
| 4,918,626 A | * | 4/1990 | Watkins et al. ............. 345/421 |
| 4,928,250 A | * | 5/1990 | Greenberg et al. .......... 345/426 |
| 5,027,292 A | * | 6/1991 | Rossignac et al. .......... 345/422 |
| 5,058,042 A | * | 10/1991 | Hanna et al. ............... 345/427 |
| 5,081,698 A | | 1/1992 | Kohn |
| 5,084,830 A | * | 1/1992 | Doornink et al. |
| 5,086,496 A | | 2/1992 | Mulmuley |
| 5,088,054 A | | 2/1992 | Paris, II |
| 5,159,663 A | | 10/1992 | Wake ......................... 345/422 |
| 5,177,474 A | * | 1/1993 | Kadota ....................... 345/139 |
| 5,253,335 A | | 10/1993 | Mochizuki et al. ......... 345/422 |
| 5,268,996 A | | 12/1993 | Steiner et al. .............. 345/426 |
| 5,295,243 A | | 3/1994 | Robertson et al. |
| 5,299,298 A | | 3/1994 | Elmquist et al. ............ 345/421 |
| 5,313,568 A | | 5/1994 | Wallace et al. ............. 345/426 |
| 5,329,613 A | * | 7/1994 | Brase et al. ................ 345/422 |
| 5,377,313 A | | 12/1994 | Scheibl |
| 5,384,580 A | * | 1/1995 | Kadota ....................... 345/419 |
| 5,402,532 A | | 3/1995 | Epstein et al. |
| 5,414,801 A | | 5/1995 | Smith et al. |
| 5,448,686 A | | 9/1995 | Borrel et al. |
| 5,619,592 A | | 4/1997 | Bloomberg et al. |
| 5,619,593 A | | 4/1997 | Ono |
| 5,644,689 A | * | 7/1997 | Ban et al. ................... 345/424 |
| 5,914,721 A | * | 6/1999 | Lim ........................... 345/421 |
| 6,172,679 B1 | | 1/2001 | Lim |

OTHER PUBLICATIONS

"A Characterization of Ten Hidden–Surface Algorithms", I. E. Sutherland, R. F. Sproull, R. A. Schumacker Computing Surveys, vol. 6, No. 1, 1975.*

"Fast Algorithms for 3D–Graphics", G. Glaeser, 1994.*

**Gigus et al., "Efficiently computing and representing aspect graphs of polyhedral objects", $2^{nd}$ International conference on computer vision, 1988.

**Newman et al., "Principles of interactive computer graphics", 2nd ed. 1979, McGraw Hill.

Accelerated radiosity method for complex environments H. Xu Q. Peng, Y. Liang Eurographics'89 1989.

Application Challenges to Computational Geometry, CG Impact Task Force Report CG Impact Task Force Technical Report TR–521–96, Princeton University 1996.

Computer Graphics, Principles and Practice, 2nd edition J. D. Foley A. van Dam S. K. Feiner J. F. Hughes.

New Trends in Animation and Visualization N. Thalmann D. Thalmann 1991.

Graphics Systems: Architecture & Realization R. Andreev 1993.

Analysis of Radiosity Techniques in Computer Graphics B. Kwok MSc Thesis York University, May 1992.

Image display data computer forming method–uses perspective transformation with calculation time reduction on shadow and hidden surface processing Sony 86.233751/36.

Stabbing and ray shooting in 3 dimensional space M. Pellegrini 1990.

The Geometry of Beam Tracing N. Dadoun D. Kirkpatrick 1985.

Algorithms for line transversals in space D. Avis CG1987.

Optimization of the binary space partition algorithm (BSP) for the visualization of dynamic scenes E. Torres Eurographics'90.

A mathematical Semantics of Rendering II. Approximation E. Fiume CVGIP: Graphical Models and Image Processing vol. 53, No. 1, Jan. 1991.

A Characterization of Ten Rasterization Techniques N. Gharachorloo S. Gupta R. Sproull I. Sutherland Computer Graphics, vol. 23, No. 3 (Siggraph'89) 1989.

The use of projective geometry in Computer Graphics I. Herman 1992.

Ray Tracing with Cones J. Amanatides Computer Graphics, vol. 18, No. 3 (Siggraph'84) 1984.

The A–buffer, an Antialiased hidden surface method L. Carpenter Computer Graphics, vol. 18, No. 3, (Siggraph'84) 1984.

Principles and Applications of Pencil Tracing M. Shinya T. Takahashi S. Naito Computer Graphics, vol. 21, No. 4, (Siggraph'87) 1987.

Light–water interaction using backward beam tracing M. Watt Computer Graphics, vol. 24, No. 4 (Siggraph'90) 1990.

Rendering CSG Model with a ZZ–buffer D. Salesin J. Stolfi Computer Graphics, vol. 24, No. 4 (Siggraph'90) 1990.

A solution to the hidden–line problem for computer–drawn polyhedra P. Loutrel IEEE Transactions on Computers, Mar. 1970.

Sorting and the hidden–surface problem I. Sutherland R. Sproull R. Schumacker National Computer Conference, 1970.

The Notion of quantitative invisibility and the machine rendering of solids A Appel ACM National Meeting 1967.

An analytic visible surface algorithm for independent pixel processing E. Catmull Computer Graphics, vol. 18. No. 3 (Siggraph'84) 1984.

Computing the lines piercing four lines S. Teller M. Hohmeyer Technical Report 92–665, University of California, Berkeley.

Computing the antipenumbra of an area light source S. Teller Computer Graphics, vol. 26, No. 2, (Siggraph'92) 1992.

Computer animation, theory and practice, second revised edition N. Thalmann D. Thalmann 1990.

Image Synthesis M. Brest 1992.

Management of large amounts of data in interactive building walkthroughs T. Funkhouser C. Sequin S. Teller Symposium on Interactive 3D Graphics, 1992.

Temporal Coherence in Ray Tracing S. H. Badt PhD thesis, University of Texas at Dallas, 1989.

Near real–time shadow generation using BSP trees N. Chin S. Feiner Computer Graphics, vol. 23, No. 3 (Siggraph'89) 1989.

Adaptive Display algorithm for interactive frame rates during visualization of complex virtual environments T. Funkhouser C. H. Sequin Siggraph'93 1993.

Modeling global diffuse illumination for image synthesis A. Campbell, III. PhD Thesis University of Texas at Austin 1991.

A 3–dimensional representation for fast rendering of complex scences S. Rubin T. Whitted 1980.

Radiosity redistribution for dynamic environment D. George F. Sillion D. Greenberg IEEE Computer Graphics & Applications, vol. 4, 1990.

A survey of shadow algorithms A. Woo, F. Poulin A. Fournier IEEE Computer Graphics & Applications, vol. 6, 1990.

Error–bounded antialiased rendering of complex environments N. Greene M. Kass Siggraph'94 1994.

Fast computation of shadow boundaries using spatial coherence and backprojections A. Stewart S. Ghali Siggraph'94 1994.

A fast shadow algorithm for area light sources using back-projection G. Drettakis E. Fiume Siggraph'94 1994.

Stabbing oriented convex polygons in randomized O(n 2) time. S. Teller M. Hohmeyer Contemporary Mathematics, 1994.

Obscuration culling on parallel graphics architecture C. George Technical report TR95–017 University of North Carolina at Chapel Hill 1995.

Visibility between two edges of a simple polygon D. Avis T. Gum G. Goussaint The Visual Computer, 1986, No. 2.

Increasing update rates in the building walkthrough system with automatic model–space subdivision and potentially visible set calculations J. M. Airey PhD Thesis, University of North Carolina, 1990.

Realism in computer graphics: a survey. J.Amanatides IEEE Computer Graphics and Applications, vol. 7, No. 1, 1987.

Finding a line transversal of axis objects in three dimensions N. Amenta Proc. 3rd Annual ACM–SIAM Symposium on Discrete Algorithms, 1992.

Beyond the third dimension, geometry, computer graphics and higher dimension Banchoff T. F. Scientific American Library 1990.

A general version of crow's shadow volumes Bergeron P. IEEE Computer Graphics and Applications, vol. 6, No. 9, Sep. 1986.

Me and my (fake shadow) Blinn, J. F. IEEE Computer Graphics and Applications, vol. 8, No. 1 1988.

Generating soft shadows with a depth buffer algorithm Brotman L. S. IEEE Computer Graphics and Applications vol. 4, No. 10, 1984.

A multiresolution spline with application to image mosaics Burt P. J. Adelson E. H. ACM Transactions on Graphics, vol. 2, Oct. 1983.

Hierarchical geometric models for visible surface algorithms Clark, J.H. Communications of the ACM, vol. 19, No. 10, Oct. 1976.

An overview of rendering techniques Dennis A. R. Computer & Graphics, vol. 14, No. 1, 1990.

Hybrid shadow testing scheme for ray tracing Eo K. S. Kyung C. M. Computer Aided Design vol. 21, No. 1 Jan. 1989.

Hierarchical rendering of complex environments Greene, N. PhD dissertation, University of California, Santa Cruz 1995.

Bibliography of hidden–line and hidden–surface algorithms Griffiths, J. G. Computer–Aided Design, vol. 10, May 1978.

The light buffer: a shadow–testing accelerator Haines, E. A. Greenberg, D. IEEE Computer Graphics and Applications, vol.6, No. 9, Sep. 1986.

Algorithms for antialiased cast shadows Hourcade J. C. Nicolas A. Computer and Graphics, vol. 9, No. 3 1985.

Hemi–cube ray–tracing: a method for generating soft shadows Meyer U. Proceedings, Eurographics'90, 1990.

Principles of interactive computer graphics, 1st edition Newman, W. M. Sproull, R. F. 1973.

A comparison of four visibility acceleration techniques for radiosity Ng, A. The visual computer, 1996, vol. 12, pp. 307–316.

Shading models for point and linear sources Nishita, T. Okamura, I. Nakamae, E. ACM transactions on graphics, vol. 4, No. 2, Apr. 1985.

Radiosity of dynamic scenes in flatland with the visibility complex Orti, R. Riviere S. Durand F. Puech C. Proceedings, Eurographics'96 1996.

Visibility, occlusion, and the aspect graph Plantinga H. Dyer C. R. International Journal of computer vision, vol. 5, No. 2, 1990.

Necessary and sufficient conditions for hyperplane transversal Pollack R. Wenger R. Proc. 5th Annual Symposium on Computational Geometry, 1989.

Shading and shadowing with linear light sources Poulin P. Amanatides J. Proceedings, Eurographics'90 1990.

Rendering antialiased shadows with depth maps Reeves W. Salesin D. Cook R. Proceedings, Siggraph'87 1987.

Machine perception of three–dimensional solids Roberts L. G. Optical and Electro–Optical Information Processing, J. Tippett (editor) MIT Press, 1965.

Procedureal elements for computer graphics Rogers D. F. McGraw–Hill(publisher) 1985.

Optics B. Rossi Addison–Wesley(publisher) 1957.

An optimal algorithm for detecting weak visibility of a polygon J. Sack S. Suri IEEE transactions on computers, vol. 39, No. 10, Oct. 1990.

Shaded rendering and shadow computation for polyhedral animation Seales W. B. Dyer C. R. Proceedings, Graphics Interface '90, May 1990.

Optics, third edition Sears F. W. Addison–Wesley Publishing Co. 1949.

Linear programming and convex hulls made easy Seidel R. Proc. 6th ACM Symposium on Computational Geometry, 1990.

Output–sensitive visibility algorithms for dynamic scenes with applications to virtual reality Sudarsky O. Gotsman C. Proceedings, Eurographics'96 1996.

Automatic view function generation for walk–through animation using a reeb graph Shinagawa Y. kunii T. Nomura Y. Okuna T. Young Y. Computer Animation '90 1990.

Octant priority for radiosity image rendering Wang Y. Davis W. Proceedings, Graphics Interface'90 1990.

Casting curved shadows on curved surfaces Williams L. Proceedings, Siggraph'78 1978.

Pyramidal parametrics William L. Proceedings, Siggraph'83 1983.

Accelerated radiosity method for complex environments Xu H. Peng Q. Liang Y. Proceedings, Eurographics'89 1989.

Pyramid clipping for efficient ray traversal Zwann M. Reinhard E. Jansen F. Proceedings of the Sixth Eurographics Rendering Workshop 1995.

Application challenges to computational geometry, CG impact task force report CG impact task force Princeton University Computer Science Dept. Technical Report TR–521–96 http://graphics.lcs.mit.edu/.about.seth/pubs/taskforce/techrep.html http://www.cs.princeton.edu/.about.chazelle/taskforce/CGreport.ps.Z http://graphics-.lcs.mit.edu/.about.seth/pubs/Pubs.html 1996.

My response to application challenges to computational geometry Franklin R. http://www.ecse.rpi.edu/Homepages/wrf/geom.sub.—response.html http://netlib.bell–labs.com/netlib/compgeom/discuss/archive/96/ta skforce.html 1996.

Comments on the report "Application challenges to computational geometry" Heckbert P. http://www.cs.duke.edu/.about.jeffe/compgeom/files/heckbert.html http://netlib.bell–labs.com/netlib/compgeom/discuss/archive/96/ta skforce.html 1996.

Follow–up comments on the report "Application challenges to computational geometry" Coulson T. http://www.cs.duke.edu/.about.jeffe/compgeom/files/coulson.html http://netlib.bell–labs.com/netlib/compgeom/discuss/archive/96/ta skforce.html 1996.

Inside Quake: visible surface determination http://www.gamers.org/dEngine/quake/papers/ddjpvs.html 1996.

CGDC Quake Talk http://www.gamers.org/dEngine/quake/papers/mikeab–cgdc.html 1996.

Quake hidden surface removal http://www.gamers.org/dEngine/quake/papers/ddjzsort.html 1996.

Quake editing tools information http://www.gamers.org/dEngine/quake/QuakeEd/qedit.sub.—infor.html 1996.

Zen of graphics programming Abrash M. 1996.

Computer graphics: more unsolved problems Siggraph'91 panel 1991.

Global illumination in architecture and entertainment Siggraph'96 course notes 1996.

Interactive walkthrough of large geometric databases Siggraph'96 course notes 1996.

Imprecise computation and load sharing in computer generated imaging system Berger M. Zhao W. Graphics Interface '90 1990.

Exploiting temporal coherence in ray tracing Chapman J. Calvert T. Sill J. Graphics Interface'90 1990.

Approximate ray tracing Dauenhauer D. Graphics Interface '90 1990.

Approximate and probabilistic algorithms for shading and rendering structured particle systems Reeves W. Siggraph 1985 1985.

Fundamentals of interactive computer graphics Foley J.D. van Dam A. Addison–Wesley Publishing Co. 1982.

Mulit–pass multi–resolution algorithm for the determination of hidden surfaces Lim, H. L. Inter–faculty symposium on computer graphics and image processing 1987.

Ten Unsolved Problems in Rendering Heckbert P. S. Workshop on Rendering Algorithms and Systems, Gaphics Interface'87 www addr: http://www.cs.cmu/.about.ph (index page) 1987.

Cainter's & z–buffer algorithms Course note, CS deprt, Carnegie–Melon university www addr: http://www.cs.cmu.edu/afs/cs/project/anim/ph/463.95/pub/www/notes.toc.html 1996.

3D comes alive Ozer, J. PC magazine, Jun. 25, 1996.

Affordable 3–D workstations Hummel, R. L. Byte Dec. 1996.

Gaming in the next dimension Case, L. Salvator, D. Computer Gaming Jul. 1996.

3D engine list Isakovic, K. www addr: http://www.cs.tu–berlin.de/.about.ki/engines.html 1996.

OpenGL the leading visual programming interface www addr: http://www.sgi.com/Proucts/Dev.sub.–environ.sub.—ds.html 1996.

3D computer graphics (second edition) Glassner A. S. Design Press 1989.

The UC Berkeley system for interactive visualization of large architectural models T. Funkhouser S. Teller C. Sequin D. Khorramabadi Presence, vol. 5, No. 1, Winter 1996.

Visibility computation for efficient walkthrough of complex environment R. Yagel R. William Presence, vol. 5, No. 1, Winter 1996.

Large models for virtual environments: A review of work by the architecutal walkthrough project at UNC M. R. Mine H. Weber Presence, vol. 5, No. 1, Winter 1996.

A hidden–line algorithm for hyperspace R. P. Burton D. R. Smith SIAM Journal of Computing vol. 11, No. 1, Feb. 1982.

Canonic representations for the geometrics of multiple projective views Q. T. Luong T. Vieville University of California at Berkely CS Dept. Tech. Report UCB/CSD093–772 1993.

Multidimensional graphing in two–dimensional spaces T. Mihalisin E. Gawlinski J. Timlin J. Schwegler Computers in Physics, Nov./Dec. 1989.

A framework for global illumination in animated environments J. Mineroff J. Dorsey H. Rushmeier Rendering Techniques'95 (Proceedings of the Eurographics Workshop in Dublin, Ireland Jun. 1995.

Shadows for bump–mapped surfaces N. L. Max Advanced Computer Graphics (Proceedings of Computer Graphics Tokyo '86) 1986.

The simulatoin of natural features using cone tracing D. Kirk Advanced Computer Graphics (Proceedings of Computer Graphics Tokyo '86) 1986.

Simulating soft shadows with graphics hardware P. S. Heckbert M. Herf Carnegie–Melon University CS Dept. Technical Report CMU–CS–97–104 1997.

Spatial transformation for rapid scan–line surface shadowing P. Robertson IEEE computer graphics & applications Mar. 1989.

Incremental update of the visibility map as seen by a moving viewpoint in two dimensions S. Ghali A. J. Stewart Eurographics Workshop on Animation and Simulation, Aug. 1996.

Z. H. Zhao D. Dobkin Continuous algorithms for visibility: the space searching approach fourth eurographics workshop on rendering 1993.

Y. Shinagawa S. Miyoshi T. Kunii Viewpoint analysis of drawings and paintings rendered using multiple viewpoints: cases containing rectangular objects Fourth Eurographics Workshop on Rendering 1993.

F. Jansen A. Chalmers Realism is real time Fourth Eurographics Workshop on Rendering 1993.

P. Schuytema How to bake a quake Computer Gaming Jul. 1996.

Efficient Collision Detection for Animation and Robotics Ming C. Lin 1993.

Fast Computation of Shadow Boundaries Using Spatial Coherence and Backprojections A James Stewart Sherif Ghali.

Polygon shadow generation Atherton P. Weiller K. Greenberg D. Proceedings, Siggraph'78.

Designing real–time 3d graphics for entertainment Siggraph'96 course notes.

Foley, "Computer Graphics: Principles and Practice, Second Edition" Addison–Wesley Publishing Company, Inc. pp. 663–665, 772, 783, 793–797, 805 (1990).

Sutherland, "A Characterization of Ten Hidden–Surface Algorithms," Computing Surveys, vol. 6, No. 1, pp. 38–39, Mar. 74.

Jain et al., "Imprecision in Computer Vision", Advances in Fuzzy Sets, Possibility and Applications, 1983.

E. Catmull, "Computer display of curved surfaces" in IEEE Transactions of Computers, p. 309–315, 1971.

M. F. Cohen et al., "The hemi–cube: A Radiosity solution for complex environment", Computer Graphics (SIGGRAPH '85), vol. 19, No. 3, p. 31–40, 1985.

G.A. Crocker, "Invisibility coherence for faster scan–line hidden surface algorithms", Computer Graphics, vol. 18, No. 3, p. 95–102, 1984.

H. Hubschman et al., "Frame–to–frame coherence and the hidden surface computations: Constraints for a Convex World", Computer Graphics, vol. 15, No. 3, p. 45–54, 1981.

H.L. Lim, "Fast hidden surface removal through structural analysis and representation of objects and their contours", Computer Graphics International '87, p. 75–88, 1987.

H.L. Lim, "Toward a fuzzy hidden surface algorithm", Computer Graphics International '92, p. 621–635. 1992.

H.L. Lim, "An efficient hidden surface algorithm for polyhedral surfaces" in International Conference on Computer & Communications in Science & Technology, Beijing, China, 1986.

C. Hornung, "A method for solving the visibility problem", IEEE Computer Graphics & Applications, vol. 4, p. 26–33, 1984.

J. Griffiths, "A depth–coherence scanline algorithm for displaying curved surfaces", Computer–aided Design, vol. 16, No. 2, p. 91–101, 1984.

E.A. Haines et al., "Shaft culling for efficient ray–traced radiosity", Proceedings of Eurographics Workshop on Rendering, Jul., 1991.

H. Plantinga et al., "Real–time hidden–line elimination for a rotating polyhedral scene using the aspect representation", in Graphics Interface '90 Proceedings, p. 9–16, 1990.

J.M. Airey et al., "Towards image realism with interative update rates in complex virtual building environment", in ACM SIGGRAPH Special Issue on the 1990 Symposium on Interactive 3D Graphics vol. 24, p. 41–50, 1990.

Y. Wang, "Image synthesis using front–to–back based radiosity methods", Ph.D. thesis, University of Alberta, 1992.

D.R. Baum et al., "The back–buffer algoriram: an extension of the radiosity method to dynamic environments", The Visual Computer, vol. 2, No. 5, p. 298–306, 1986.

S.J. Teller er al., "Visibility preprocessing for interactive walkthroughs", Computer Graphics, vol. 25, No. 4, p. 61–69, 1991.

J. Marks et al., "Image and intervisibility coherence in rendering", Graphics Interface '90 Proceedings, p. 17–30, 1990.

H.L. Lim, "Rendering techniques in three–dimensional computer graphics", Ph.D. thesis, University of Sydney, 1993.

S.J. Teller, "Visibility computations in densely occluded polyhedral environment", Ph.D. thesis, University of California at Berkeley, 1992.

A.S. Glassner, "Principles of Digital Image Synthesis", vol. 2, Morgan Kaufmann Publisher, San Francisco, 1995.

D. Gordon et al., "Front–to–back display of BSP trees", IEEE Computer Graphics & Applications, vol. 11, p. 79–85. 1991.

K.L. Shelley et al., "Path specification and path coherence", Computer Graphics, vol. 16, No. 3, p. 157–161, 1982.

J. Vilaplana et al., "Exploiting coherence for clipping and view transformations in radiosity algorithms", in Eurographics Workshop on Photosimulation, Realism and Physics in Computer Graphics, Rennes, France, p. 137–149, 1989.

C.B. Jones, "A new approach to the 'hidden line' problem", Computer Journal, vol. 14, No. 3, p. 232–236, 1971.

F.C. Crow, "Shadow algorithms for computer graphics", Computer Graphics, vol. 11, No. 2, p. 442–448, 1977.

X. Pueyo, "The use of visibility coherence for radiosity computation", in First International Conference on Visualization and Intelligent Design in Engineering and Architecture, p. 17–28, 1993.

T. Nishita et al., "Continuous tone representation of three–dimensional objects taking account of shadows and interreflection", Computer Graphics, vol. 19, No. 3, p. 23–30, 1985.

T. Funkhouser, "Database and display algorithms for interactive visualization of architectural models", Ph.D. thesis, University of California at Berkeley, 1993.

S.J. Teller et al., "Global visibility algorithms for illumination computations", in Computer Graphics (SIGGRAPH '93), vol. 27, p. 239–246, 1993.

S. Coorg et al., "Temporally coherent conservative visibility", in Twelfth Annual ACM Symposium on Computational Geometry, Philadelphia, ACM Press, New York , p. 1–10, 1996.

S. Coorg et al., "A spatially and temporally coherent object space visibility algorithm", Laboratory of Computer Science, MIT, Technical Report TM–546, 1996.

D.P. Luebke et al., "Portal and mirrors: simple, fast evaluation of potentially visible sets", in Proceedings 1995 Symposium on Interactive 3–D Graphics, ACM Press, New York, 1995.

H. Plantinga, "Conservative visibility preprocessing for efficient walkthroughs of 3D scenes", Graphics Interface '93 Proceedings, p. 166–173, 1993.

E. Catmull, "A subdivision algorithm for computer display of curved surfaces", Ph.D. thesis, Utah University, Dec. 1974.

J. Arvo et al., "A survey of ray tracing acceleration techniques" in An Introduction to Ray Tracing, editor: A.S. Glassner, Academic Press, London, p. 201–262, 1989.

A. Watt et al., "Advanced Animation and Rendering Techniques, Theory and Practice", ACM Press, New York, 1992.

F. Sillion et al., "Radiosity and Global Illumination", Morgan Kaufmann Publisher, San Francisco, 1994.

D.R. Baum et al., "Improving radiosity solutions through the use of analytically determined form–factors", Computer Graphics, vol. 23, No. 3, p. 325–334, 1989.

A. Fournier et al., "On the power of the frame buffer", ACM Transaction on Graphics, vol. 7, No. 2, 103–128, 1988.

C.W. Grant, "Integrated analytic spatial & temporal anti–aliasing for polyhedra in 4–Space", Computer Graphics, vol. 19, No. 3, p. 79–84, 1985.

P. Hsiung et al., "T–Buffer: fast visualization of relativistic effects in spacetime", ACM SIGGRAPH Special Issue on the 1990 Symposium on Interactive 3D Graphics 24, p. 83–88, 1990.

A. Inselberg, "The Plane with parallel coordinates", The Visual Computer, vol. 1, p. 69–91, 1985.

N.L. Max et al., "A two–and–a–half–D motion–blur algorithm", Computer Graphics (SIGGRAPH '85), vol. 19, No. 3, p. 85–93, 1985.

K.V. Steiner et al., "Hidden volumes: the 4th dimension", Computer Graphics World, p. 71–74, Feb. 1987.

L.A. Zadeh, "Fuzzy Sets", Information and Control, vol. 8, p. 338–353, 1965.

W. Siedleckiet al., "Mapping techniques for exploratory pattern analysis" in Pattern Recognition and Artificial Intelligence, E.S. Gelsema, L.N. Kanal (eds), Elsevier, New York, p. 277–299, 1988.

S. Chang, "On fuzzy mapping and control", IEEE Transactions on Systems, Man & Cybernetics, vol. SMC–2, No. 1, p. 30–34, 1972.

R. Jain et al., "Imprecision in computer vision" in Advances in Fuzzy Sets, Possibility and Applications, P. Wang, (ed), Plenum Press, New York, p. 217–236, 1983.

N. Greene et al., "Hierarchical & buffer visibility", Computer Graphics (SIGGRAPH '93), vol 27, p. 231–238, 1993.

D. Greenberg et al., "Radiosity: a method for computing global illumination", The Visual Computer, vol. 2, p. 291–297, 1986.

H. Fuchs et al., "New real–time shaded display of rigid objects", Computer Graphics, Vol 17, No. 3, p. 65–72, 1983.

C.M. Hoffman et al., "Some techniques for visualizing surfaces in four–dimensional space", Computer–aided Design, vol. 23, No. 1, p. 83–91, 1991.

J.M. Lane et al., "Scan line methods for displaying parametrically defined surfaces", Communications of the ACM, vol. 23, No. 1, p. 23–34, 1980.

J.A. Gualtieri et al., "The visual potential: one convex polygon", Computer Vision, Graphics and Image Processing, vol. 46, No. 1, p. 96–130, 1989.

Z. Gigus et al., "Computing the aspect graph for line drawings of polyhedral objects", in Proceedings of IEEE Conference on Computer Vision and Pattern Recognition, Computer Society Press, New York, p. 654–661, 1988.

P.S. Heckbert et al., "Beam tracing polygonal objects", Computer Graphics, vol. 18, No. 3, p. 119–127, 1984.

J. Zhou, "Visualization of four dimensional space and its applications", Ph.D. thesis, Purdue University, 1991.

R. Jain, "Application of fuzzy sets for the analysis of complex scenes" in Advances in Fuzzy Set Theory and Applications, M.M. Gupta et al. (eds), North–Holland, Amsterdam, p. 577–583, 1979.

D. Tost et al., "A definition of frame–to–frame coherence", Computer Animation '90, p. 207–221, 1990.

Y. Leung, "Spatial Analysis and Planning under Imprecision", North Holland, Amsterdam, 1988.

J.R. Wallace et al, "A ray tracing algorithm for progressive radiosity", Computer Graphics, vol. 23, No. 3, p. 315–324, 1989.

H. Fuchs et al., "On visible surface generation by a priori tree structure", Computer Graphics (SIGGRAPH'80), vol. 14, p. 124–133, 1980.

M.F. Cohn et al., "A progressive refinement approach to fast radiosity image generation", Computer Graphics, vol. 22, No. 4, p. 75–84, 1988.

K. Kanatani, "Group–theoretical Methods in Image Understanding", Springer Verlag, Berlin, 1990.

J.K. Aggarwal et al., "Dynamic scence analysis" in Image Sequence Processing and Dynamic Scene Analysis, T.S. Huang (ed), Springer Verlag, Berlin, p. 40–73, 1983.

N.I. Badler et al., "Motion: Representation and Perception" Elsevier, New York, 1986.

Subbarao, "Interpretation of visual motion: A computational study", Pitman, London, 1988.

F. Sillion et al., "A general two–pass method integrating specular and diffuse reflection", Computer Graphics, vol. 23, No. 3, p. 335–344, 1989.

R.J. Recker et al., "Acceleration Techniques for Progressive Refinement Radiosity", ACM SIGGRAPH Special Issue on the 1990 Symposium on Interactive 3D Graphics, vol. 24, p. 59–66, 1990.

E. H. Ruspini, "A new approach to clustering", Information and Control 15, p. 22–32, 1969.

A. Kaufmann, "Theory of Fuzzy Subsets. Vol I, Fundamental Theorectical Elements", Academic Press, London, 1975.

T.S. Huang, "Image Sequence Processing", Springer Verlag, Berlin, 1981.

P.A. Ligomenides, "Modeling uncertainty in human perception" in Uncertainty in Knowledge–Based Systems, B. Bouchon, R. Yager (eds), Springer Verlag, Berlin, p. 337–346, 1986.

A. Inselberg, "N–Dimensional Graphics. Part I. Lines & Hyperplanes", IBM Scientific Center Report G320–2711, Jul. 1981.

A.S. Glassner, "3D Computer Graphics: A User's Guide for Artists & Designers", 2nd edition, Design Press, New York, p. 139–158, 1989.

M.F. Cohen et al., "Radiosity & realistic image synthesis", Academic, New York, 1993.

J. Aggarwal et al., "Analysing dynamic scenes containing multipe moving objects" in Image Sequence Analysis, editor: T.S. Huang, Springer–Verlag, Berlin, p. 355–380, 1981.

A. Appel, "The Notion of quantitative invisibility and the machine rendering of solids", Proceedings ACM National Conference, Thompson Books, Washington, DC, p. 387–393, 1967.

J. Vince, "Computer Animation", Addison–Wesley, New York, 1992.

Y. Chrysanthou et al., "Computing dynamic changes to BSP–trees", Eurographics '92, vol. 11, No. 3, p. C–321–C–332, 1992.

S. Ansoldi et al., "Geometric modeling of solid objects by using a face adjacency graph presentation" Computer Graphics (SIGGRAPH '85), vol. 19, No. 3, p. 131–138, 1985.

N. Chin et al., "Fast object–precision shadow generation for area light sources using BSP trees", Proceedings 1992 Symposium on Interactive 3D Graphics, p. 21–30, 1992.

D.S. Immel et al., "A radiosity method for non–diffuse environments", Comuter Graphics, vol. 4, p. 133–142, 1986.

* cited by examiner

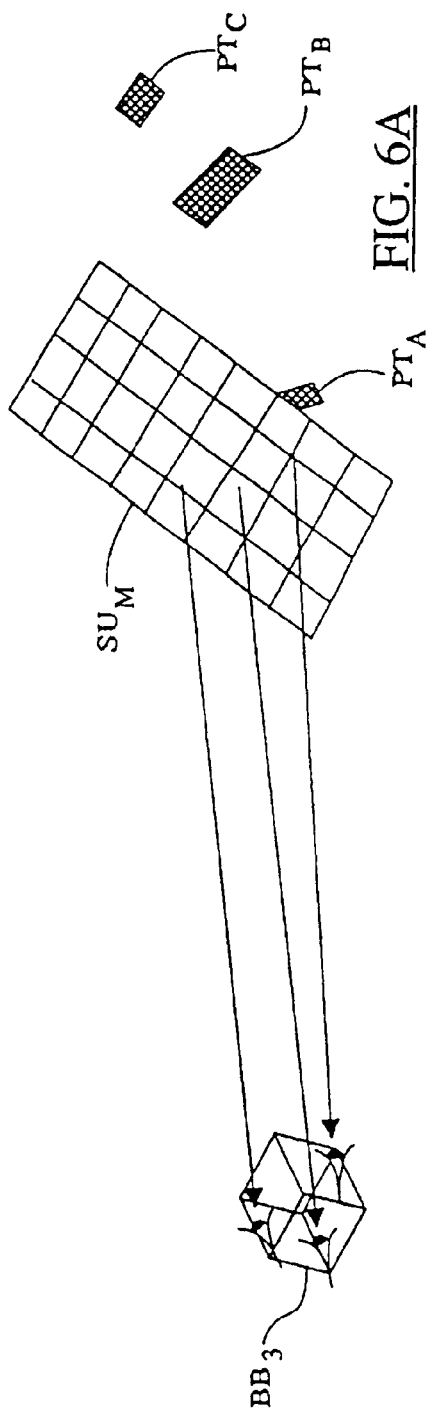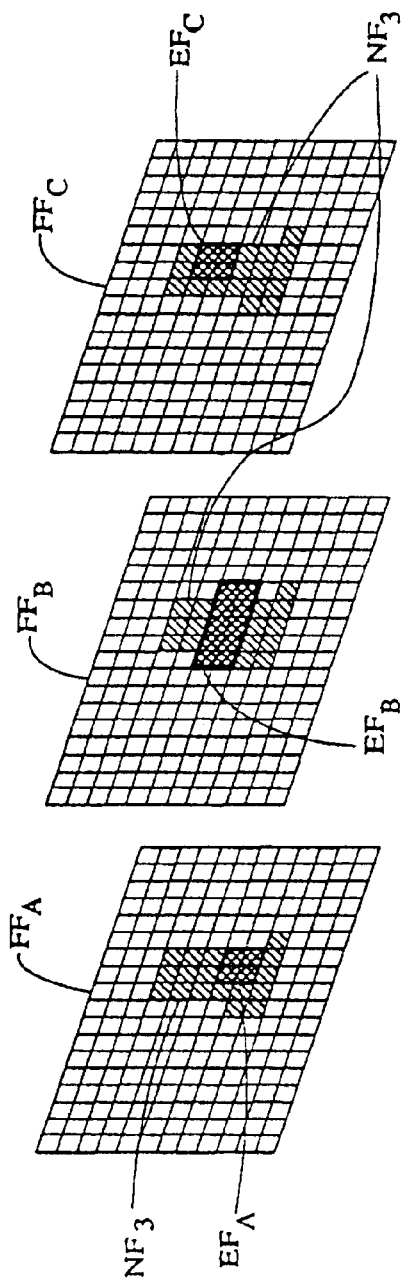

VISIBILITY CALCULATIONS FOR 3D COMPUTER GRAPHICS

CROSS RELATED APPLICATIONS

Under 35 U.S.C. §120this application is a continuation of U.S. Ser. No. 08/935,150, filed Sep. 22, 1997 U.S. Pat. No. 6,172,679, which is a continuation of U.S. Ser. No. 08/182,096, filed Jun. 1, 1994 U.S. Pat. No. 5,914,721, which is a U.S. National Phase filing of PCT application PCT/AU92/00302, filed Jun. 19, 1992.

FIELD OF INVENTION

The present invention relates to computer graphics and, in particular, to the efficient determination of visible and/or invisible surfaces to thereby preferably permit improved hidden surface removal, generally in 3D systems.

BACKGROUND ART

Visible surface detection is one of the most basic operations in 3D graphics. It is applied to generate images of surfaces directly visible to a viewer. Recently, it has also been adopted in the radiosity calculations to compute the energy interactions between surfaces.

The standard strategy of visible surface detection is to divide surfaces into patch elements and compare the spatial relationship between these elements. Using this strategy, the visibility of surfaces cannot be determined until they have been analysed in detail. Although many techniques have been developed to address this issue, none are ideal as they either still require elaborate analysis of surfaces, or they impose various restrictions to the scene.

The limitations of the current techniques can seriously affect the speed of visible surface computation. If the scene is complicated, many surfaces may be invisible. However, the image generation is often slowed down by the need to analyse each surface element in detail. The same limitation has also seriously affected the efficiency of the radiosity computations. Currently, these computations are very slow due to the need to elaborately compute the visibility between every pair of surface elements. Again, these computations may be substantially reduced if surface elements obviously visible or invisible to each other can be more easily computed.

The early visible surface techniques mainly applied various sorting schemes to find the occluding surface primitives. However, with the advancement in hardware technology, it is now common practice to reduce the need for sorting and comparisons by using a large amount of fast memory. This memory may be used to store the object data, such as a BSP-tree. It may also be used to store the depth and surface projection data, as with a z-buffer.

The z-buffer method is simple and has a very low growth rate. However, it still requires depth evaluations and comparisons at each pixel by all the patches projecting onto it, because their visibility is unknown.

The BSP-tree method has the advantage that if the scene is static, an orderly traversal of the BSP-tree is generally sufficient to establish the depth order. However, it still requires the scan-conversion of each path. In addition, the technique needs to re-compute the BSP-tree whenever objects in the scene move. There have been two main strategies of avoiding detailed depth analysis of totally invisible entities. One strategy, applies the property that visibility changes can only occur at the contour edges of surfaces. Visibility computations of internal edges or patches can be reduced by first comparing them with these edges.

An alternative strategy is to use the invisible coherence of the scene. These techniques apply the property that an edge is likely to remain invisible in a scan line if it is invisible in the last scan line. Such an edge may therefore be treated specially to avoid unnecessary depth comparisons.

Although the above strategies can reduce some visibility computations, they have limitations. The contour-oriented techniques can operate only in environments which consist exclusively of convex or non-penetrating surfaces. Both the contour-oriented and the scan line approaches are also limited in their ability to reduce visibility computations. In the former, an edge still needs to be tested against the contour edges even if it is invisible. In the latter, all the invisible edge segments at each scan line have to be sorted. These segments also require depth comparisons with the pixels they are on. Finally, all these techniques require some sorting or searching.

SUMMARY OF THE INVENTION

It is an object of the present invention to substantially overcome, or ameliorate, the problems associated with the prior art, through provision of an improved method for performing visibility calculations.

The invention features a method of reducing the visibility related computations in 3-D computer graphics, where the visibility related computations are performed on 3-D surfaces or their sub-elements, or a selected set of both.

In a general aspect of the invention, the method of reducing the visibility related computations includes determining which of the 3-D surfaces or their sub-elements are always invisible or always visible to a viewpoint or a group of viewpoints by projection based computations prior to a visibility computation. The method also includes treating the determined ones of the 3-D surfaces or their sub-elements differently than remaining ones of the 3-D surfaces or their sub-elements during visibility computation.

By determining which of the 3-D surfaces or their sub-elements are always invisible or always visible at the preprocessing stage and by treating the determined ones of the 3-D surfaces or their sub-elements differently than remaining ones during visibility computation, the computation complexity and time request for the visibility computations are significantly reduced.

Embodiments of this aspect of the invention may include one or more of the following features.

The projection based computations include defining projection planes and identifying regions on the projection planes. One or more projection planes are defined with respect to a viewpoint or a group of viewpoints such that projections of selected 3-D surfaces can be formed on them. For example, in one embodiment, identifying regions includes dividing each projection plane into one or more grids and defining a data structure for storing said projections on thegrids in computer storage. The grid or grids are either regular or irregular. The data structure of the computer storage is based on a z-buffer or a quadtree.

In another embodiment, the determining step includes identifying the grid cells which are under or related to the projections or extents of projections associated with said 3-D surfaces or their sub-elements and comparing the data associated with said 3-D surface or their sub-elements with the data associated with the grid cells. The data are or related to the depths of said 3-D surfaces or their surface elements.

One preferred embodiment of the treating step is to ignore the determined 3-D surfaces or surface elements which are always invisible or always visible during the visibility computation. Intuitively, this scheme results in complexity reduction in the visibility computation. Other features and advantages of the invention will be apparent from the description and drawings, and from the claims.

BRIEF DESCRIPTION OF THE DRAWINGS

A preferred and a number of other embodiments of the present invention will now be described with reference to the drawings in which:

FIGS. 6A to 6D show the detection of totally invisible patches:

Appendix 1 describes The Detection of Patches Front-Facing to a Viewpoint Bounding Box;

Appendix 2 describes The Computation of the Fuzzy Extent of Boundary Edges and Patches;

Appendix 3 describes The Computation of the Non-Fuzzy Regions;

Appendix 4 describes The Scan-Conversion of the Fuzzy Regions;

Appendix 5 describes Using a Cache to Speed up the Access and Writing of Fuzzy Elements Within the Fuzzy Extent of a Patch;

Appendix 6 describes the direct computation of the fuzzy region of an edge;

Appendix 7 describes scan-conversion of patches on the hemi-cube pyramid; and

Appendix 8 is a list of references.

BEST AND OTHER MODES FOR CARRYING OUT THE INVENTION

The preferred embodiments relate to various methods for calculating three dimensional computer graphic images and they are generally termed herein as the "fuzzy projection methods".

A Simple Fuzzy Projection Method

In this embodiment a method is provided to map the projections of entities at one or more viewpoints to a set of planes. This embodiment also provides a means to compute regions which contain all these projections and regions which are within each and every projection. The spatial position, time and the optical properties described in this embodiment can be replaced by other physical or abstract variables if the replacement does not affect the mathematical relationship of entities in the graphic image.

Prior to detailed discussion of this and the other embodiments, it is useful to introduce various terms and define variables used in 3D graphics.

Figure 1B:
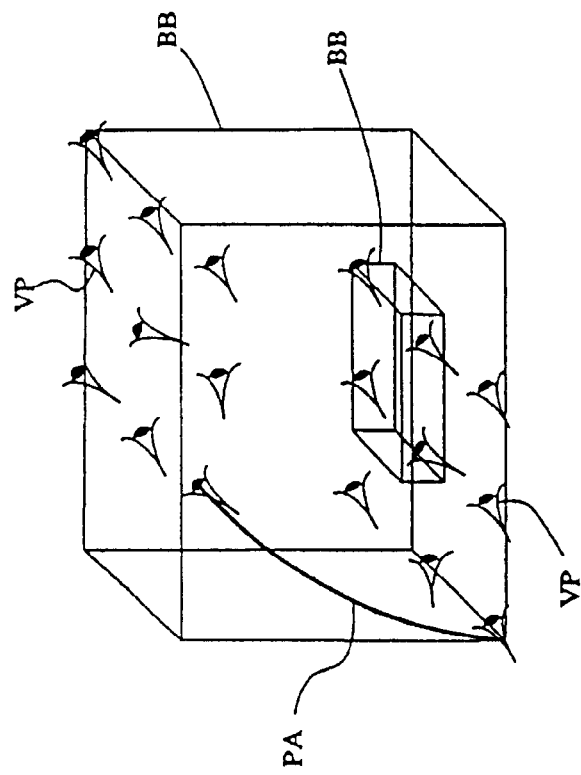
FIGS. 1A and 1B show two viewpoint hierarchies.
Figure 1A:
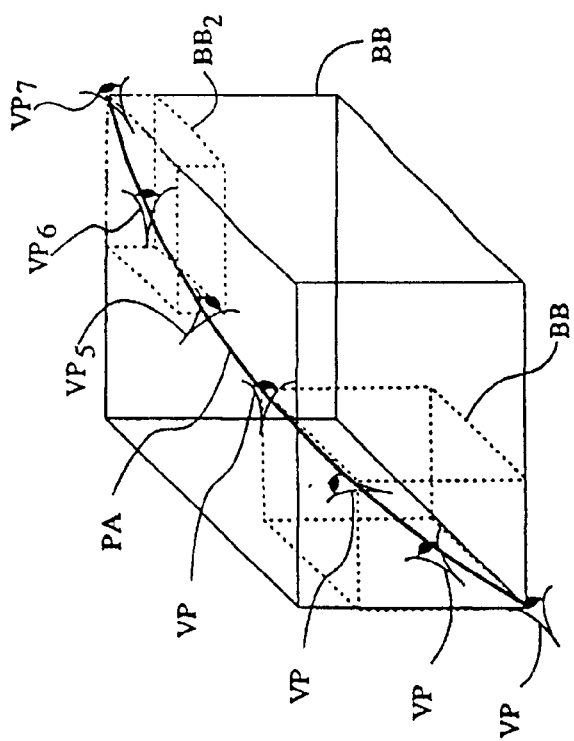
Figure 2:
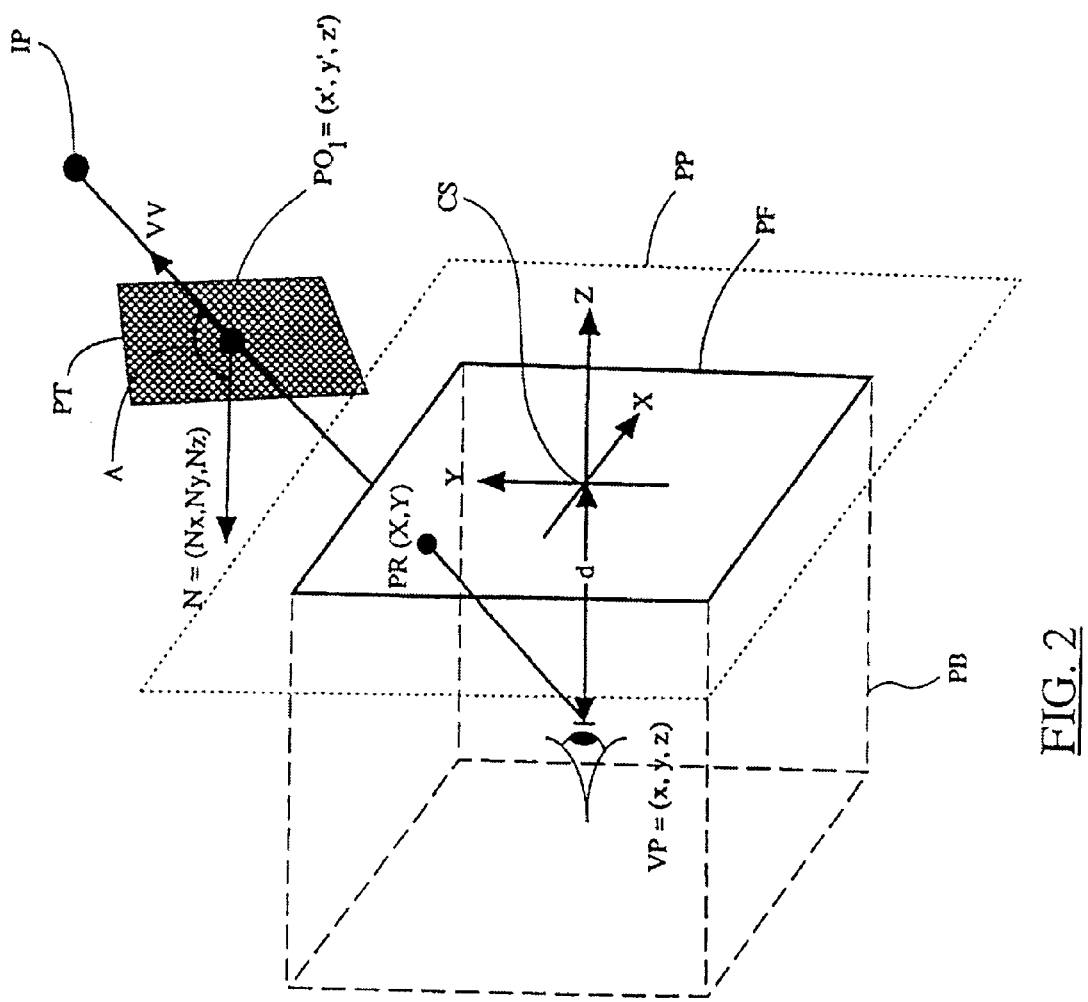
FIG. 2 illustrates the projections at an arbitrary viewpoint.

Firstly, with reference to FIGS. 1A, 1B and 2, a viewer, as shown by the eyeballs in the FIGS., is an abstract and dimensionless observer where the visibility of its surrounding objects is to be obtained. A point is visible to a viewer if a ray fired from the viewer to it is not blocked by any opaque object. There can be more than one viewer at any time and each viewer may move or rotate over the time. A viewpoint VP is the spatial position and orientation of a viewer at an instance of time. A view vector VV is a vector from the viewpoint VP to a point PO being observed (see FIG. 2).

Several viewpoints VP can be grouped together through certain properties they share. Related groups of viewpoints may in turn form a higher level group. This merging may be repeated to create a viewpoint hierarchy. A current group is the group of viewpoints VP that are currently being considered. In FIG. 1A, viewpoints $VP_1$, $VP_2$, $VP_3$ and VP4 each reside on a path $PA_1$ and represent viewpoints at times 1, 2, 3 and 4, and can be considered as one group. Similarly, for the viewpoints $VP_5$–$VP_7$.

Each group of viewpoints is associated with a coordinate system called the group coordinate system CS. A viewpoint bounding box BB of a group of viewpoints VP is the smallest right quadrangular prism enclosing these viewpoints and whose edges are parallel to the axes of the group coordinate system. If the positions or occurrences of a group of viewpoints are not precisely defined, the associated viewpoint bounding box should be the said prism which encloses the space likely to be occupied by these viewpoints. A group of viewpoints may be lying on a plane or a point. In such cases, the viewpoint bounding box may degenerate into a plane or a point. A point PO is totally visible from the bounding box BB if it is always visible from every possible viewpoint VP in the box BB. Conversely, a point is totally invisible from the bounding box if it is hidden from the view of every possible viewpoint VP in the box BB. In FIG. 1A, viewpoints $VP_1$–$VP_4$ reside in a bounding box $BB_1$, and viewpoints $VP_5$–$VP_7$ reside in a bounding box $BB_2$. The boxes $BB_1$ and $BB_2$ can be considered as first level bounding boxes. If the boxes $BB_1$ and $BB_2$ are combined, a second level bounding box $BB_3$ is formed. Rather than the bounding box being a square or rectangular prism, it can also be an ellipsoid, sphere or arbitrary volume.

A viewpoint group may be degenerated and contain only a single viewpoint. In this manner, all the techniques applicable to a normal viewpoint group are also applicable to a single viewpoint. In this case, the viewpoint bounding box BB degenerates into a point which coincides with the viewpoint VP.

In FIG. 1B, multiple viewers at different times are illustrated. A path $PA_2$ of one viewer of a group is shown extending between locations at two points in time. $VP_8$ represents the viewpoints at time "1" and $VP_9$ the viewpoints at time "2", with $BB_4$ the bounding box at time "1" and $BB_5$ the bounding box of the union of the viewpoints $VP_8$ and $VP_9$. Referring now to FIG. 2, shown is a projection box PB, a right quadrangular prism with its centre on a viewpoint VP and its edges parallel to the principal axes of the current group coordinate system CS. The six facets of the box PB are called the projection faces PF. Each projection face PF is on a plane called a projection plane PP. The projection PR of a point $PO_1$ in the direction perpendicular to a projection plane PP is the intersection between that plane PP and the view vector VV from the viewpoint VP to the point $PO_1$. Conversely, since a straight line emanating from the viewpoint VP can only intersect the projection point PR on a projection plane PP, a location on that plane also represents a unique viewing direction from the viewpoint. In this manner:

$VV = PO_1 - VP$

The area around the visible space point PO, is a visible patch PT and the view vector VV passes through this to an invisible space point IP, occluded by the patch PT.

The projection calculations on each plane are identical to the finding of the image region of an object in the direction perpendicular to that plane. The projection of an object to a projection plane PP therefore represents its image region in the direction parallel to the normal N of that plane.

A viewpoint VP may not be omni-directional but has a limited field of view. Hence certain projection faces may be partially or totally unobservable from the viewpoint. The hidden area of a projection face PF can be obtained by intersecting it with the viewing horizon of the viewpoint VP.

Locations on the projection plane PP can be expressed by a coordinate system CS called the projection coordinates. The origin of this coordinate system is at the centre of the projection face PF. Its x, y axes are parallel to the edges and its z axis is parallel to the normal of the face.

Because they are all parallel, the projection coordinate systems of the current group of viewpoints VP have the same scale factor so that points having the same viewing direction from their viewpoints always have the same projection coordinates.

If points on two surfaces project on the same location, PR for example, on a projection face PF, an occlusion is taking place. The point on the surface further to the viewpoint VP is hidden by the point on the surface closer to the viewpoint VP unless the latter is transparent. This can be determined by the distances d between these points PR and the viewpoint VP.

Every edge of the projection boxes PB of a group is parallel to one of the principal axes (x, y or z) of the respective group coordinate system CS. Since the vectors parallel to the principle axes can have at most six directions, these faces are classified by their normal directions into six sets.

Figure 3:
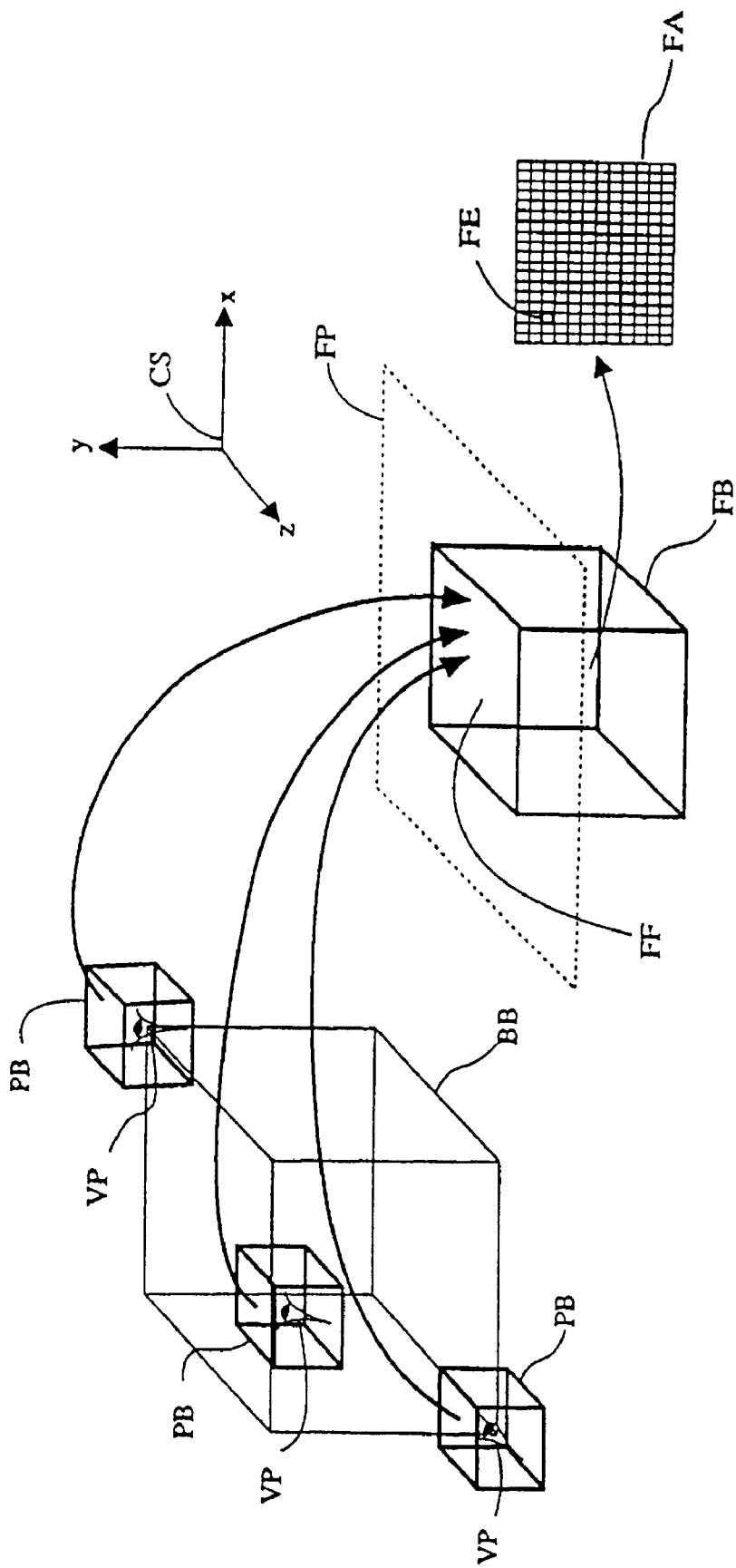
FIG. 3 shows the relationship between projection boxes and a fuzzy projection box.

This is shown in FIG. 3 where viewpoints $VP_1$, $VP_2$ and $VP_3$, each with respective projection boxes $PB_1$, $PB_2$ and $PB_3$, reside within a bounding box $BB_1$.

The projections on projection boxes $PB_1$–$PB_3$ can be correlated by another box whose edges are also parallel to the axes of the current group coordinate system CS. This box is called the fuzzy projection box FB. It is called "fuzzy" because it is the combined projection of a single surface (or object, entity, etc.) from all viewpoints, with the combined projection creating a fuzzy image of the surface. Each face of the box is called a fuzzy projection face FF. The face FF lies on a plane called the fuzzy projection plane FP. A projection coordinate system can be defined for a fuzzy projection plane FP and the fuzzy projection face PF on it.

Similar to the projection coordinate systems CS of the projection planes, the origin of this coordinate system is at the centre of the fuzzy projection face FF and its axes are respectively parallel to the edges and the normal of the face FF.

By setting the scale factor of the projection coordinate system of each of the fuzzy projection planes to be the same as the scale factor of their associated projection planes PP, each set of projection planes/faces have a one-to-one mapping with the fuzzy projection plane/face that is facing the same direction. Points on a projection plane/face can therefore be linearly mapped to the associated fuzzy projection plane/face.

Points on a set of projection planes having the same projection coordinates, and hence representing the same viewing direction, map to a point on the associated fuzzy projection plane that has the same coordinates. Therefore, similar to the projection planes PP, a point on the fuzzy projection plane FP also represents a unique viewing direction. However, the point is not associated with a particular viewpoint. Since the viewpoints VP can have a limited field of view, some areas of the projection planes may be unobservable. The hidden area of a fuzzy projection face FF is the area where the corresponding areas on all the associated projection faces are hidden. A fuzzy projection face FF is inactive if all its area is hidden.

To sample the projections on the fuzzy projection box FB, each fuzzy projection plane FP is tessellated by two sets of parallel and evenly spaced grid lines forming a fuzzy array FA. By ensuring that there are always grid lines on the edges of the fuzzy projection faces FF, these faces are divided into identical rectangular or square cells. Each cell is called a fuzzy element FE. Each element FE, in additional to representing the viewing direction associated with its centre, also represents a unique solid angle A of viewing directions, as seen in FIG. 2, represented by its perimeter.

Although other representation schemes such as the quadtree subdivision can be applied. All the z-buffer oriented operations would be accordingly changed to operation under such scenes, however the regular subdivision of the faces is considered the most efficient embodiment of the present invention.

Surfaces in the viewing environment are approximated by meshes of patches PT. A surface can also be represented by a hierarchy of patches. Different levels of the hierarchy are meshes of patches at different details. Each patch PT is treated as flat and is approximated by a polygon. The projection of a surface SO to a viewpoint VP is the region combining all the projection regions of its patches. This region is called the projection region PE of the surface. Since the projection region PE of a patch PT represents its image region, the projection region PE of a surface SO also represents the image region of that surface.

The smallest right quadrangular prism just enclosing the patch and whose edges are parallel to the axes of the current group coordinate system is called the bounding volume of the patch. The shortest and longest depths of a patch are the shortest and longest depths between the current viewpoints and points on the patch. The depth corresponds to the z-magnitude in the coordinate direction perpendicular to the projection planes currently being considered. As they are usually difficult to find, they are approximated by the shortest and the longest depths between the viewpoint bounding box and the bounding volume of the patch, which can be determined by partitioning the space by the planes of the viewpoint bounding box and determining which partitions the bounding volume of the patch is in.

Figure 4:
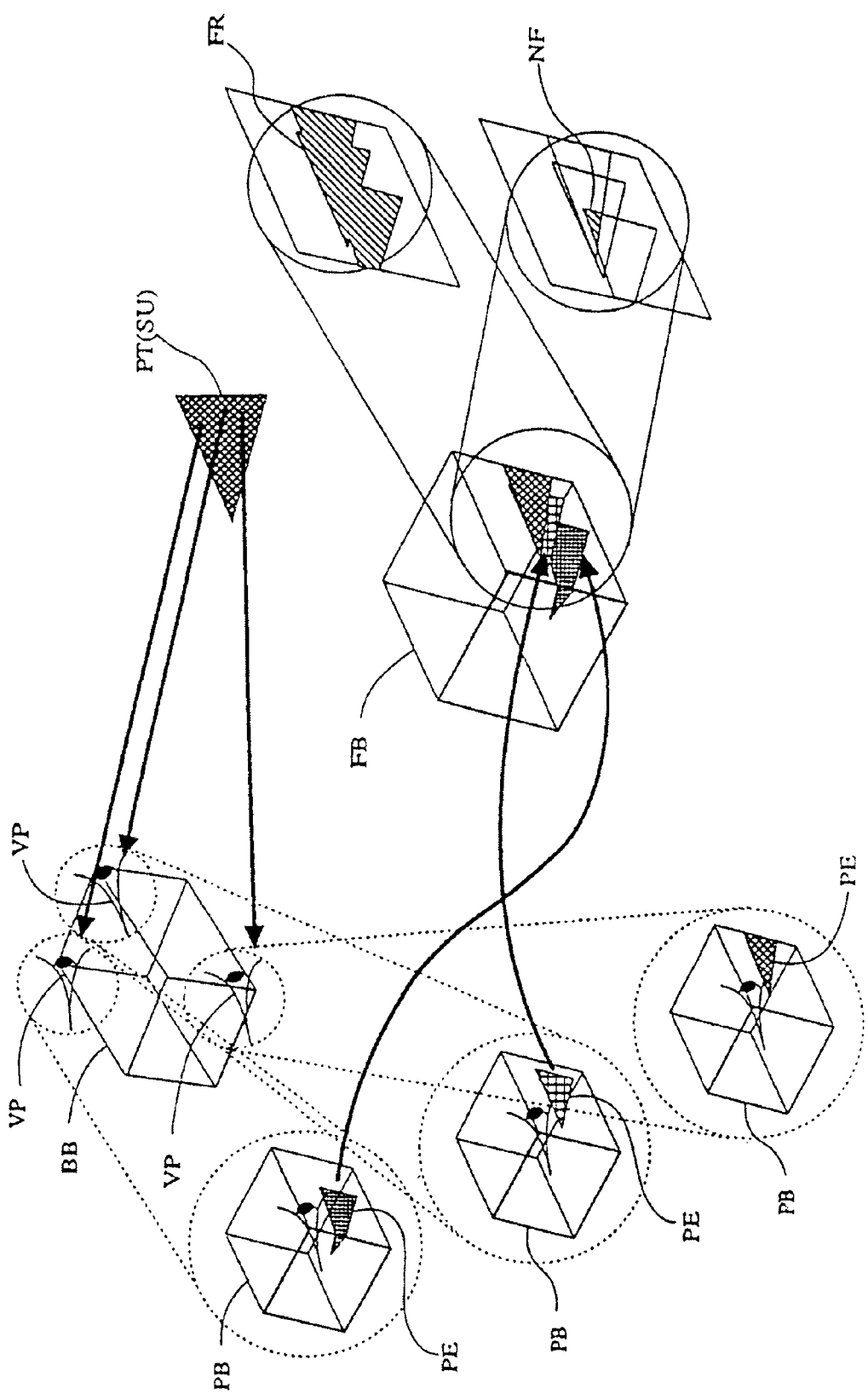
FIG. 4 shows the creation of fuzzy and non-fuzzy regions.

This is shown in FIG. 4 where a patch PT of a surface is viewed from points $VP_1$, $VP_2$ and $VP_3$ in a bounding box $BB_1$. Associated with each viewpoint $VP_1$–$VP_3$ is a projection region $PE_1$–$PE_3$ which is seen to intersect with the corresponding projection face $PF_1$–$PF_3$ in a different manner for each viewpoint $VP_1$–$VP_3$.

The projections of the patch PT on the same set of projection faces $PF_1$–$PF_3$ can be mapped to the associated fuzzy projection face FF. The areas on the fuzzy projection box $FB_1$ containing all these mappings are called the fuzzy (combined) regions FR of the patch because logically the region is fuzzy. They cannot tell whether the patch PT1 actually projects on the corresponding area on each projection box PB1–PB3. Similar to the case of patches, the fuzzy region FR of a surface SU is produced by combining the mappings of the surface projections for a number of patches. In this manner each projection region of the surface is the logical-OR of all the projections of the patches, and the fuzzy projection of each patch is the logical-OR of its projection regions. Accordingly, the fuzzy region FR of a surface SU is also the logical-OR of the fuzzy projections of its patches. This region is equivalent to the superimposition of all the images of the surface seen from the current viewpoints.

On the fuzzy projection box $FB_1$, there can also be areas which are always mapped on by the projection regions of the surfaces from the current group of viewpoints. On these areas the logical-AND of the projection regions $PE_1$–$PE_3$ of the surface SU is true. Because the outcomes of the logical-AND operations are always a subset of the outcomes of the logical-OR operations, these areas are always within the fuzzy region FR of the surface SU.

Logically the areas are non-fuzzy as the projection status of the corresponding areas on the current projection boxes is always true. Therefore they are called the non-fuzzy region NF. An alternative term is the umbra region.

The non-fuzzy region NF of a surface SU can be obtained by mapping the projections of the surface at all the current group of viewpoints on the fuzzy projection box FB and finding the area within every projection. However, this is costly if there are many viewpoints. To reduce the computations, a series of approximations which err on the side of caution are applied.

It will be apparent to those skilled in the art that there can exist plural non-fuzzy regions for each surface.

Figure 5A:
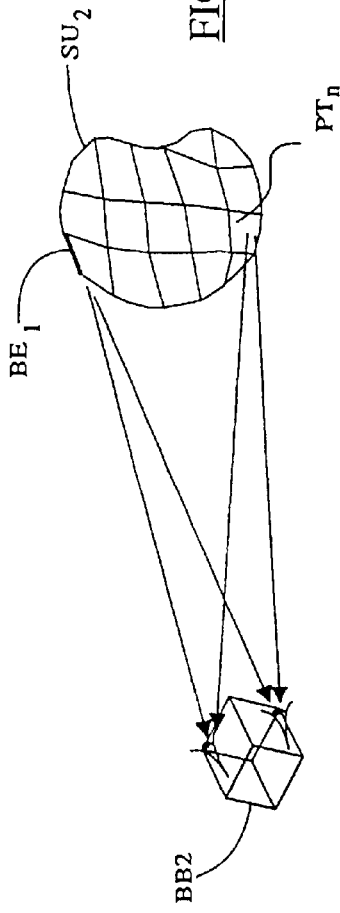
FIGS. 5A, 5B and 5C show a front-facing surface and its corresponding fuzzy and non-fuzzy regions.

Referring to FIG. 5A, the first approximation assumes that the viewpoints can be at any position in the current viewpoint bounding box $BB_2$ and each viewpoint has a field of view containing all the possible fields of view of the current group of viewpoints. The patches $PT_n$ facing all these viewpoints are determined. They are called the front-facing patches. A method for finding these patches is described in detail in Appendix 1.

Interconnected front-facing patches $PT_n$ are grouped into surface regions called the front-facing sub-surfaces $SU_2$. The edges at the borders of these regions are called the boundary edges BE. Since the front-facing patches $PT_n$, and their boundary edges BE, are facing all the possible viewpoints VP in the viewpoint bounding box BE, a front-facing sub-surface $SU_2$ never curves back and is always facing these viewpoints. The projections of its boundary edges BE therefore always surround its projection region PR.

Figure 5C:
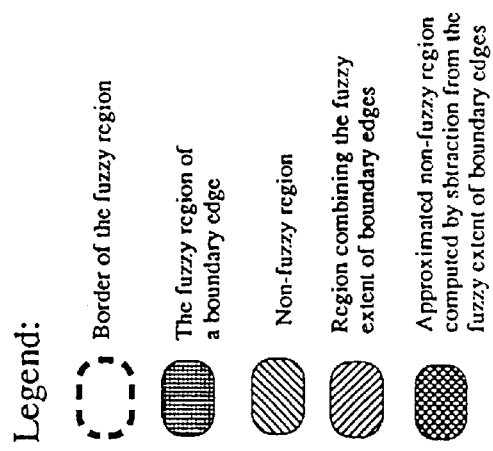
Figure 5B:
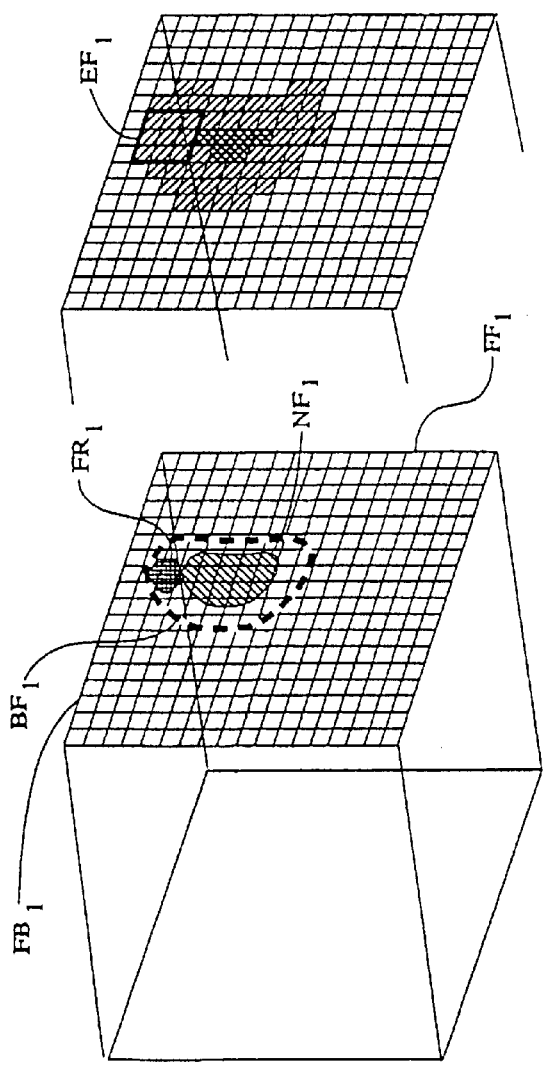

Similar to the patches as shown in FIG. 5B, the projection of each boundary edge BE can be mapped on the fuzzy projection box $FB_1$. A fuzzy region $FR_1$ of the edge $BE_1$ is the region on the box $FB_1$ which contains all the projection mappings of that edge at every possible viewpoint in the current viewpoint bounding box $BB_2$.

The fuzzy regions of all boundary edges belonging to a front-facing sub-surface can be combined into an area called the fuzzy boundary region BF. If a point is not in the fuzzy boundary region BF, the boundary edges BE do not project on all the associated points on the projection boxes. Because any change of projection status must be at the projection of the boundary edges, the point must be within every mapping of the projection regions of the front-facing sub-surface SU, or it must be outside all the mappings.

Since the fuzzy region is the combined projection of the front-facing sub-surface, any area within it must be mapped by at least one projection region of the sub-surface. Therefore, the areas inside it but outside the fuzzy boundary region BF always contain the mappings of the projection regions of the sub-surface. These areas by definition are the non-fuzzy region NF1 of the front-facing sub-surface.

As the viewpoints can have any orientation and be anywhere in the viewpoint bounding box BE, the fuzzy region FR of an edge is difficult to compute. However, the extent of this region on a fuzzy projection face can be more easily obtained. The computation of this extent is described in Appendix 2. The smallest rectangle totally enclosing this extent and with boundary on the grid lines of the fuzzy projection plane is called the fuzzy extent EF of the edge on that plane.

This is seen in FIG. 5C where the same fuzzy projection face of FIG. 5B is shown in which the fuzzy boundary region BF, is replaced by the fuzzy extents EF, of the boundary edges $BE_1$ . . . etc. The region containing all the fuzzy extents EF of the boundary edges always encloses the fuzzy boundary region of the front-facing sub-surface. Therefore, the subtraction of it from the fuzzy region FR produces an area always within the non-fuzzy region. This area is used to approximate the non-fuzzy region NF.

If a surface contains large patches and hence large boundary edges, the use of the fuzzy extents to approximate its fuzzy boundary region may be inefficient. The fuzzy regions of its boundary edges can be directly evaluated using the method described in appendix 6. Alternatively, each edge can be divided into sub-edges. The fuzzy region of that edge can then be replaced by the fuzzy extents of its sub-edges.

An Invisibility Fuzzy Projection Method for the Detection of Totally Invisible Patches.

In this embodiment a method is provided to compare the mappings of entities on the fuzzy projection faces FF associated with a group of viewpoints VP. Through this operation, entities which may be treated as invisible to all these viewpoints, can be detected.

Referring to FIG. 6A, a viewpoint boundary box $BB_3$ is shown to observe three patches $PA_A$, $PT_B$ and $PT_C$ through a mesh surface SUM. FIGS. 6B, 6C and 6D show respectively the fuzzy extents $EFA$, $EF_B$ and $EF_C$ for the patches $PA_A$, $PT_B$ and $PT_C$ on respective fuzzy projection faces $FF_{A-C}$. Also shown is the non-fuzzy region $NF_3$ of the mesh surface $SU_M$.

Figure 5E:
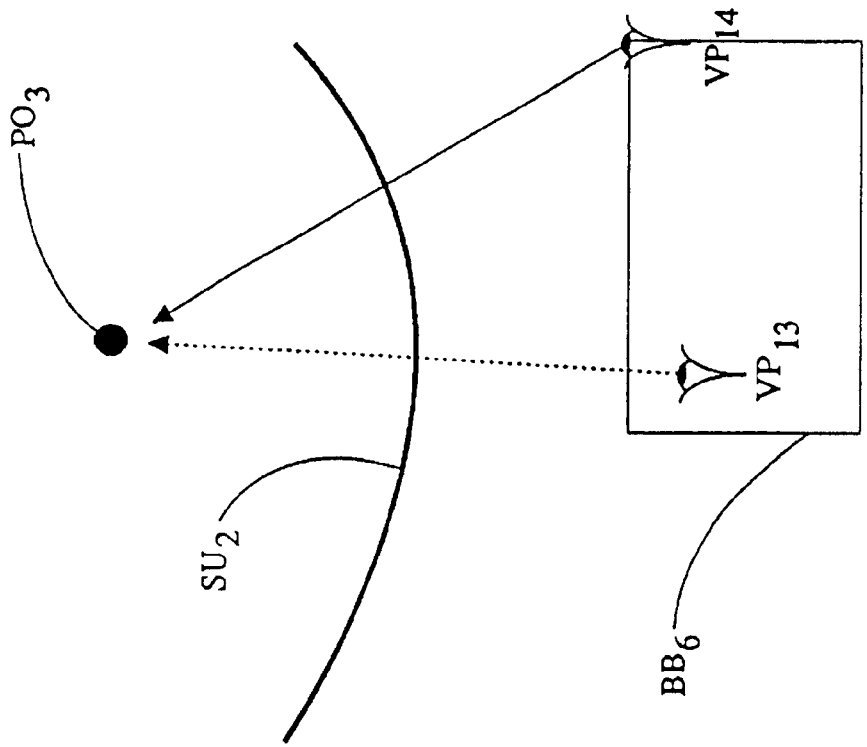
FIG. 5E shows a point that is totally hidden to a viewpoint bounding box.
Figure 5D:
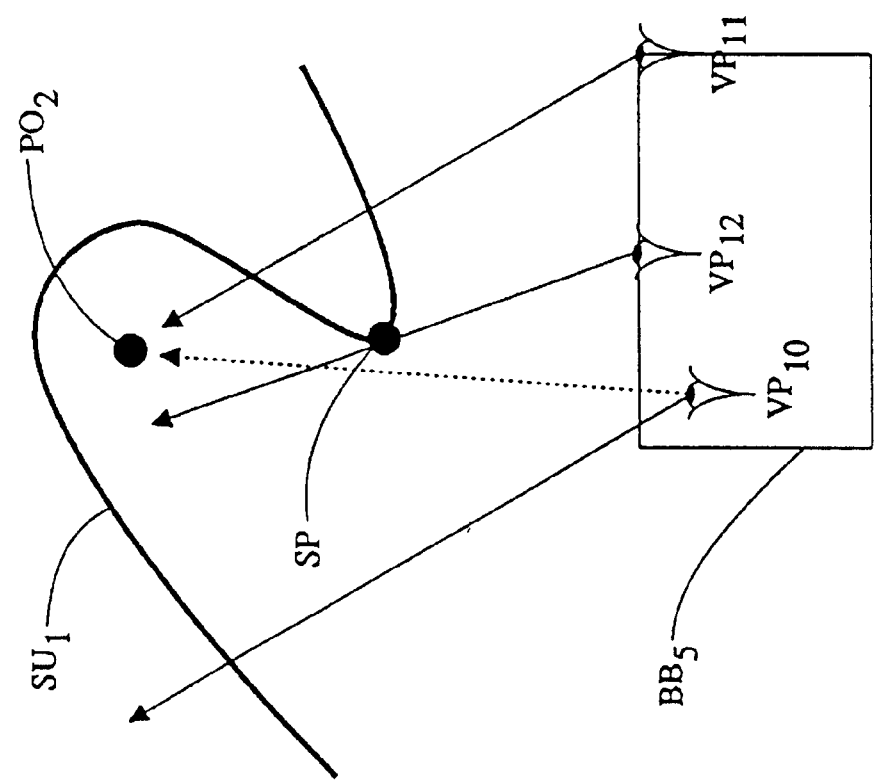
FIG. 5D shows a point that is not totally hidden to a viewpoint bounding box.

The determination of totally invisible surfaces is based on a property of the non-fuzzy regions. In FIG. 5D, point $PO_2$ is hidden by surface SU1 from viewpoint $VP_{11}$ in the current viewpoint bounding box $BB_5$. If the point is visible from another viewpoint $VP_{10}$ which is also in $BB_5$, then $SU_1$ has to curve back and reach behind $PO_2$. However, in such a situation part of $SU_1$ next to a point SP would become back-facing to viewpoint $VP_{12}$ in $BB_5$. $SU_1$ would then contain several front-facing surfaces which do not contain the surface around PO2. The non-fuzzy region of SU1 then would not cover the projection mapping of PO2. Because of the above property, if the projection mapping of a point from an arbitrary point in the Current viewpoint bounding box is within the non-fuzzy region of a surface, and if that point is behind the surface from the viewpoint, that point would always be hidden by the surface from all viewpoints in the box. This is shown in FIG. 5E. Here, the invisibility detection is performed using a single viewpoint (either one of $VP_{13}$ or $VP_{14}$ or other in the box $BB_6$).

The above observation can be used to detect totally invisible patches, each patch whose visibility is to be determined is selected. The fuzzy elements within the projection mapping of the patch from a viewpoint in the viewpoint bounding box are accessed. If the distance stored in each element is smaller than the depth of the patch from the viewpoint in the direction associated with that element, the patch is an always invisible patch because of the property of non-fuzzy regions just mentioned.

To reduce the above computations, the projection mapping of the patch can be substituted by the extent of that mapping, or the fuzzy extent of the patch. Alternatively, the depth of the patch from the viewpoint may be replaced by the longest possible depth between the patch bounding box and the viewpoint or the viewpoint bounding box. Such approximations always err on the side of caution and do not affect the correctness of hidden surface computations.

A 2D fuzzy arrays $FA_A$, $FA_B$, $FA_C$, with as many storage elements as the fuzzy elements EF on each active fuzzy projection face $FF_{A-C}$ are allocated to store the mapping information on the face. All the fuzzy arrays FAA C are collectively called a fuzzy buffer generally, a memory that is two-dimensionally addressable.

Each fuzzy element EF contains a depth field. The depth field stores the depth of the patch PT whose fuzzy extent EF surrounds the fuzzy element FE.

A cycle of fuzzy buffer computations is applied for each group of viewpoints. First, the depth fields are initialized to infinity to indicate that no surface has yet been projected on the projection box PB.

The fuzzy extents EF of the boundary edges BE and the fuzzy extents EF of the patches PT of a front-facing sub-surface of selected opaque surfaces are computed (as described in Appendix 2). Usually, large surfaces are selected. Based on these extents, the non-fuzzy region NF of the front-facing sub-surface is computed by a scan line technique described in Appendix 3. Furthermore, the fuzzy region of an edge can be found by direct computation as described in Appendix 6. Using the above, the longest depth of the fuzzy elements in each horizontal segment of every non-fuzzy region are obtained. The distance stored in each element of the array is compared with the depth stored in the corresponding element in the fuzzy buffer. If the latter is larger, it is replaced by the former.

After all the non-fuzzy regions of the opaque front-facing sub-surfaces have been updated to the fuzzy elements, each element in the fuzzy buffer contains the longest depth of the closest surface that can be seen from a chosen viewpoint in the current viewpoint bounding box in the direction associated with that element. The fuzzy buffer can then be used to compute patches totally invisible from the current viewpoint bounding box. These patches are deemed to be totally invisible patches. To detect totally invisible patches, the fuzzy elements within the fuzzy extent, the projection mapping, or the extent of the mapping, of each patch are accessed. If the depth stored in each element is smaller than the shortest depth of the patch, the patch is always hidden in the direction represented by that element. Because of the property of non-fuzzy regions, or because of the property that the fuzzy extent covers all the possible viewing directions of the patch, the patch is totally invisible if it is found to be hidden at every fuzzy element within that extent.

As seen in FIG. 6B, the fuzzy extent $EF_A$ of patch $PT_A$ falls entirely within the non-fuzzy region NF3. Accordingly, the patch $PT_A$ is hidden from the viewpoints in the bounding box $BB_3$.

In FIG. 6C, the fuzzy extent $EF_B$ of patch $PT_{VB}$ both inside and outside the non-fuzzy region NF3. Accordingly, those four elements outside may be either visible or hidden, and for the six elements inside, for all view directions through those elements, the patch $PT_B$ is hidden.

In FIG. 6D, the fuzzy extent $EF_C$ of patch $PT_C$ passes the depth test for every fuzzy buffer element it falls on. Patch $PT_C$ is always invisible from the bounding box $BB_3$.

Since there is always substantial overlappings between the fuzzy extents of adjacent patches, a high-speed cache can be used to speed up the reading and writing of the fuzzy elements within the fuzzy extent of each patch. The cache can also be used in the visibility fuzzy projection technique discussed in the next section. Appendix 5 describes in more detail the Use of a cache memory.

A Visibility Fuzzy Projection Method for the Detection of Totally visible Patches.

In this embodiment a method is provided to compare the mappings of entities on the fuzzy projection faces associated with a group of viewpoints, Through this operation entities which may be treated as visible and not hiding other entities to all these viewpoints can be detected.

For simplicity and speed, this method assumes that every surface does not hide itself in any viewing direction from the current viewpoint bounding box except those parts which do not face that direction. This implies that no two parts of the same surface that are facing a viewpoint in the bounding box would hide each other. All the planar and quadric surfaces have this property. Other surfaces can be subdivided into smaller surfaces which satisfy this criterion.

Figure 7A:
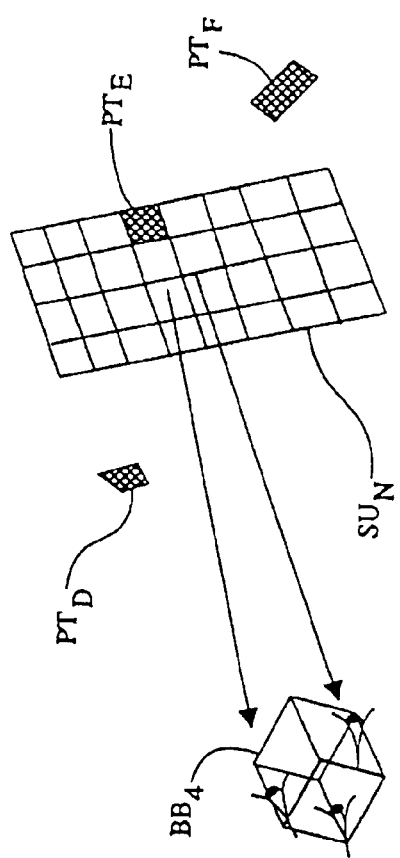
FIGS. 7A and 7B show the detection of totally visible/non-hiding patches.

As seen in FIG. 7A, a viewpoint bounding box $BB_4$ observes three patches $PT_D$, $PT_E$ and $PT_F$ arranged about a mesh surface SUN. Similar to the technique for detecting totally invisible patches, a fuzzy buffer consisting of several arrays is used to store the results of projections on the fuzzy elements.

Every element of the fuzzy buffer contains a field called the homogeneous indicator. This is a three-valued field which indicates whether there is any projection on the associated grid cell on the fuzzy projection box and whether one or more surfaces are being projected onto the cell. The indicator is zero if it is not enclosed by any fuzzy region. The indicator is one if it is inside the fuzzy region of one surface. The indicator is two if it is within the fuzzy regions of more than one surface.

First, the homogeneous indicators are initialized to zero. This shows that no surface has yet been projected on the fuzzy buffer. Using the scan-conversion technique described in Appendix 4, the horizontal segments of the fuzzy region of each surface are obtained. The homogeneous indicators under each segment are examined. Each indicator is incremented by one if it is zero or one.

After the fuzzy regions of all the surfaces have been updated into the fuzzy buffer, each patch is examined. It is ignored if it has been detected as totally invisible by the invisibility fuzzy projection technique.

If the homogeneous indicators within the fuzzy extent of the patch are all one, only one surface can be seen from the current viewpoint bounding box in all viewing directions within that fuzzy extent. The surface has to be the one the patch is on. The patch therefore does not hide other surfaces.

Since the front-facing parts of the surface do not hide each other, the patch is always visible unless when it is back-facing. The patch is called a totally visible/non-hiding patch. If some of the homogeneous indicators within the fuzzy extent of the patch are not one, the patch might be covering or be occluded by patches of other surfaces at certain viewpoints in the current viewpoint bounding box.

Figure 7B:
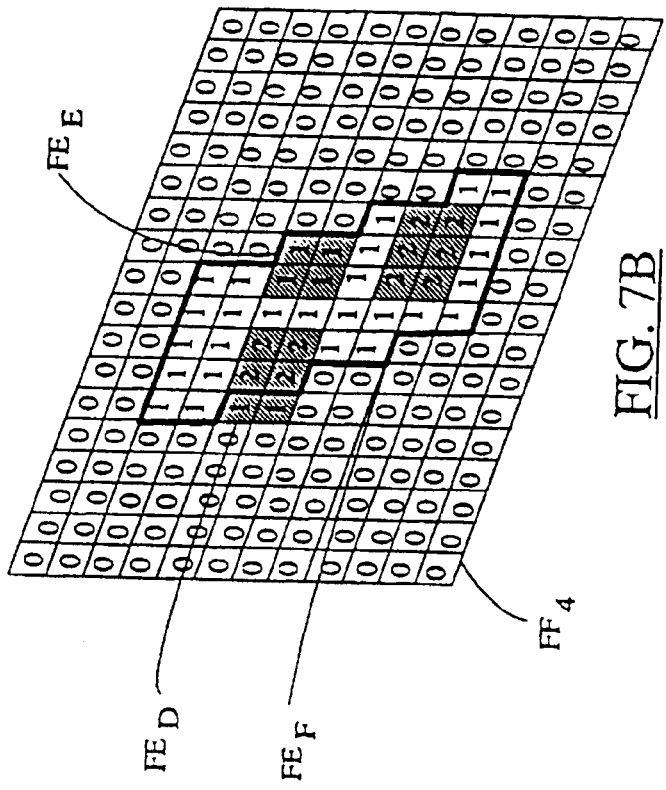

This is shown in FIG. 7B where the fuzzy projection face $FF_4$ is shown with each element having either the value 0, 1 or 2. As indicated for the patches $PT_D$ and $PT_F$ and their corresponding fuzzy elements $FE_D$ and $FE_E$, these are not totally visible and not hiding other patches as some of the fuzzy elements within their respective fuzzy extents are mapped to more than one surface. Patch $PT_E$ is totally visible/non-hidden as all its fuzzy elements FEE within its extent are mapped only to one surface (i.e. $SU_n$).

MODIFIED VISIBILITY FUZZY PROJECTION METHOD

The above technique scan-converts the fuzzy regions of each surface twice because each fuzzy element may be overlapped by the fuzzy regions of several patches of the same surface. This can be avoided by using a linked list called the projected patch list to store the overlapped patches for each fuzzy element. Other data structures such as an array can also be used in place of the linked list. The modified technique consists of the following steps:

1. As the original technique, each fuzzy element contains a homogeneous indicator and a surface ID field. It also contains a projected patch list. The homogeneous indicator and the surface ID fields are initialized to zero and null respectively to indicator that no surface has been projected on the fuzzy element. The projected patch list associated with the element is initialized to the null list.

2. Each patch contains a totally visible indicator. This indicator is initialized to ON. Each patch in the environment is accessed. The fuzzy region of each patch is computed and each element within it is accessed.

3. If the homogeneous indicator of each fuzzy element accessed is zero, the fuzzy element has not been projected onto by the fuzzy regions of any surface. The surface ID of the current patch is written to the surface ID field. The homogeneous indicator is set to one. If the totally visible indicator of the current patch is ON, its ID is added to the projected patch list of the current fuzzy element. Otherwise there is no such necessity because the projected patch list is used to reset the totally visible indicators of patches.

4. If the homogeneous indicator is one, the surface ID of the current patch is compared with the surface ID stored in the surface ID field of the current fuzzy element. If they are the same and the totally visible indicator of the patch is ON, the ID of that patch is added to the projected patch list associated with the current fuzzy element. If the ID's of the two surfaces are different, the homogeneous indicator is set to two to indicate that there is more than one surface projecting onto the current fuzzy element. The current patch and all the patches with ID's stored in the projected patch list of the current element may not be totally visible. Therefore, their totally visible indicators are set to OFF. Records in the projected patch list can be removed after all their totally visible indicators have been updated.

5. If the homogeneous indicator is two, the current fuzzy element has already been found to be projected onto by more than one surface. The current patch therefore may not be totally visible. The totally visible indicator of its record is set to OFF.

6. After the processing of all patches a patch is determined to be totally visible if its totally visible indicator has not been set to OFF.

The pseudo-code of the above processing is shown below:

```
initialize the totally invisible indicators of all patches to
    ON;
initialize the homogeneous indicator of all fuzzy elements
    to zero;
clear all projected patch lists of the fuzzy elements;
for (each patch of the current surface)
do
    for (each fuzzy element under the fuzzy region of the
        patch)
    do
        if (the homogeneous indicator is zero)
        then
            write the surface ID of the current patch to the
                surface ID
            field;
            set the homogeneous indicator to one;
            if (the totally invisible indicator of the current
                patch is not OFF)
                add the patch ID to the projected patch list of
                the fuzzy element;
            endif
        else if (the homogeneous indicator is one)
        then
            if (the surface ID of the current patch is the same as
                the surface ID stored in the fuzzy element)
            then
                if (the totally invisible indicator of the current
                    patch is not OFF)
                    add the patch ID to the projected patch list of
                    the fuzzy element;
                endif
            else
                set homogeneous indicator to two;
                set the totally invisible indicator of the current
                    patch and each patch indexed by the projected
                    patch list of the fuzzy element to OFF;
            endif
        else
            set the totally invisible indicator of the current
            patch to OFF;
        endif
    done
done
```

Use of the Visibility and Invisibility Methods for the Radiosity Methods By the application of the foregoing methods, a list of the totally invisible patches and the totally visible/non-hiding patches can be obtained for a viewpoint group. The visibility of these patches remains the same for all the subgroups and viewpoints under that group. Therefore these patches need not go through elaborate visibility computations in these subgroups and viewpoints.

For each viewpoint in the group, the totally invisible patches may be ignored. The totally visible/non-hiding patches need not be compared with other patches to determine their visibility and form-factors. Their form-factors can be computed directly from their orientations, positions and shapes using mathematical formulas describing the radiative transfer between surfaces.

If a patch is bright or close to the current group of viewpoints, the direct form-factor computations need to be carried out in higher accuracy. The patch can be subdivided into smaller patches and the form-factor computations are carried out for these sub-patches instead. Alternatively, accurate radiative transfer formulas such as the Nussel analog technique can be used. This technique finds the fractional area of the patch after it has been projected onto the surface and then the base of a hemisphere whose centre is at the viewpoint.

If accurate form-factor computations are not required, the form-factor of a patch for the current group of viewpoints may be obtained by assuming that it is constant throughout that patch. The standard form-factor equation can be simplified to:

$$F = \cos A * \cos B * A / (\pi r * r)$$

where A and B respectively are the angles between the view vectors and the normals of the observed patch, and the patch the viewpoint is on, and r is the distance between the viewpoint and the centre of the observed patch.

The fuzzy projection methods require orderly top-down traversal of viewpoints according to their hierarchy. However, in techniques such as the progressive refinement methods, the receiving patches are usually accessed in decreasing order of their brightness. Therefore, if these techniques are used in conjunction with the fuzzy projection methods, the form-factor computations of some viewpoints in a group may not have been carried out since not all the viewpoints within the group may be processed in one go. Information about which are the totally visible/non-hiding patches and which are the totally invisible patches of the partially completed group has to be stored in memory. The outstanding viewpoints in the group can then use this information when their turn to be processed has arrived. This information can be removed when all the viewpoints in the group have been processed.

In techniques such as the progressive refinement methods (known per se), the form-factors between patches have to be repeatedly computed. Therefore, if memory permits, the information about which patches are totally visible/non-hiding and which patches are not totally invisible may not be removed and can be advantageously used.

In the first round of computations, all the fuzzy projection and normal hemicube computations for every receiving patch are carried out as required. During these computations, the emission patches at each group/viewpoint are classified into three groups: totally visible/non-hiding, totally invisible, and the remainder. This classification information is stored using data structures such as arrays or linked lists.

In subsequent rounds of computations, where the form factors between patches have to be re-evaluated, the fuzzy projection computations are not repeated. The totally visible/non-hiding and the totally invisible patches of each viewpoint can be simply retrieved from the stored information.

The memory for storing the classification of patches for each group of viewpoints can be reduced by several methods. First, since patches found to be totally visible/non-hiding or totally invisible from a group will maintain the same status for all its subgroups, they need not be repeatedly stored.

Secondly, because the union of the three lists of patches is the set of all the patches that need to be classified for each group of viewpoints, only two lists need to be stored for the group. To further reduce storage, the smallest pair of the three lists can be kept. Also, because the records of patches are usually orderly organized and accessed, the patch IDs in the lists usually have some order. The differences between the IDs of successive patches in the lists are often much smaller than the magnitude of these IDs. Whenever this occurs, these differences instead of the patch IDs can be stored. A sign bit can be used to distinguish between the ID's and difference values. The list can be sorted by the ID for more efficient use of this arrangement. Finally, the visibility status of patches often do not change much from one group of viewpoints to an adjacent group of viewpoints. Therefore, using the patch lists of a viewpoint group as a starting point, a series of nearby groups can store their patch lists incrementally. Starting from the first group, each adjacent group only needs to store the lists of patches that need to be deleted from, and added to the patch lists of the previous group to form the current lists. Again, a special field can be used to distinguish the use of this arrangement.

ENHANCING THE ACCURACY OF FORM-FACTOR COMPUTATIONS

The fuzzy projection techniques can also be used to achieve optimal accuracy of the form-factor computations. After the filtering off of totally invisible patches by the invisibility technique, the visibility technique detects totally visible and non-hiding patches. As mentioned above, different methods which yield different accuracy in the computations of the form-factors of these patches can be applied. The remaining patches are not totally invisible. They are also not totally visible/non-hiding. The accuracy of their form-factor computations can be determined by the following steps:

a. First, several levels are defined such that each of them corresponds to a level of accuracy to be reached by the form-factor computations of patches. Each accuracy level determines the strategies of form-factor computations such as the resolution of the hemicube buffer, the level of details of patches, whether to use ray-tracing instead of the hemicube buffer, or the number of rays traced per sampling point.

b. All the patches not found to be totally invisible or totally visible are classified by their accuracy level according to their brightness, importance, distance from the current group of viewpoints, and other properties. Each patch record has a field which stores its accuracy level. An accuracy level field is also allocated for each fuzzy element in the fuzzy buffer. Each field is initialized to the lowest accuracy level.

c. Patches are accessed in the order such that those having higher accuracy levels are scan-converted first.

For each patch accessed, the same scan-conversion of their fuzzy extents applied in the visibility fuzzy projection computations is carried out. However, instead of the homogeneous indicators, the accuracy level fields in each fuzzy element access is examined. If the value in a field is larger than the accuracy level of the patch, the patch is likely to be hiding or be hidden by a patch at a higher accuracy level. The accuracy level of the patch is set to this value. If the value is smaller than the original accuracy level of the patch, the later is written to the former.

d. After the processing of all patches, the updated accuracy level of each patch shows the maximum level of accuracy its form-factor computations needs to be carried out for the current group of viewpoints. If this level is higher than the accuracy the patch can provide, it may be recursively subdivided and replaced by sub-patches whose accuracy matches the level.

If the actual surface of a patch is curved, the projections of its sub-patches may be outside its projection. Therefore, for the subdivision strategy to be effective, the fuzzy extent of each entity should contain the fuzzy extents of all its sub-entities during all the fuzzy projections. It can be approximated by the fuzzy extent of the axis-aligned bounding box containing all these sub-entities.

e. The accuracy level field of a fuzzy element indicates the accuracy of the computations that needs to be carried out in the corresponding viewing directions from the current group of viewpoints or the corresponding regions on the hemicubes of these viewpoints. The form-factor of a patch can be computed in variable resolutions which match the different accuracy requirements of the fuzzy elements covered by that patch. This can be done in either the ray-tracing or the hemicube approach of form-factor computations.

f. In the ray-tracing approach, the form-factors of patches at a viewpoint is computed by tracing rays in all observable directions. For each of the current group of viewpoints, the number of rays to be fired within a solid angle associated with a fuzzy element depends on the accuracy level of that element. If the level is high, more than one ray should be traced. Conversely, if the accuracy levels of several adjacent fuzzy elements are low, only one ray may be traced for the directions associated with these elements.

9. In the hemicube approach, different regions on the hemicube should have different sampling resolutions which match the accuracy requirements of the fuzzy elements associated with these regions. This can be achieved by the use of a pyramidal representation called the hemicube pyramid. The scan-conversion of patches on the hemicube pyramid is described in Appendix 7.

Use of the Visibility and Invisibility Methods for Hidden Surface Computations

In this embodiment a method is provided to apply the computed results of the visibility and invisibility fuzzy projection methods in the hidden surface computations.

In shadow computations, in applications where a series of images are to be taken, such as computer animation, flight simulation, or dynamic graphics, the hidden surface removal operations need to be repeated many times. The position of the viewer when an image of the surrounding is taken may be treated as a viewpoint. The viewpoints may also be combined into a hierarchy of viewpoint groups.

If the combined field of view of the current viewpoint group is narrow, the projection boxes and the fuzzy projection box can be flattened so that only a fuzzy projection plane and its associated projection planes are active for the current group of viewpoints. By using the invisibility fuzzy projection method, patches found to be totally invisible to a group of viewpoints, do not need to be considered for the subgroups and the individual viewpoints in the group. By using the visibility fuzzy projection method no depth computations and comparisons of totally visible patches during the scan-conversion is necessary.

Use of the Visibility and Invisibility Methods for the Ray Tracing Computations

In this embodiment a method is provided to apply the computed results of the visibility and invisibility fuzzy projection techniques in the ray tracing techniques.

In a ray tracing application, the objects and surfaces in the environment are often organized as a hierarchical geometric model. If the number of rays traced from a node of the geometric model justifies the use of the fuzzy buffer methods, a viewpoint group is created by treating every point on the surfaces of that node where a ray might emit as a viewer. The position of the viewer at any instance of time is a viewpoint. The viewpoints can be grouped into a hierarchy of viewpoint groups.

From the fuzzy buffer computations, patches which are totally visible/non-hiding to a group of viewpoints corresponding to each node and patches which are totally invisible to this group of viewpoints. When a ray is traced from a node, all the totally invisible patches need not be considered. Also, the ray is tested first with the totally visible/non-hiding patches. If the ray hits one of those patches, no further testing with other patches need to be carried out as the patch being hit is the closest one on the path of the ray.

If both the radiosity method and the ray tracing techniques are used, the results of the fuzzy buffer computations can be used for both methods.

USE OF THE VISIBILITY AND INVISIBILITY FUZZY PROJECTION TECHNIQUES IN COMPUTER VISION

The visibility and invisibility fuzzy projection techniques can be used in computer vision. The occlusion analysis of objects is a vital operation in computer vision. Based on this analysis, hypotheses are made to construct a 31) model. This model is then matched with the vision data or existing models. It may be repeated matched and refined until it is acceptable. Usually there are a lot of uncertainty and vagueness in the vision data and the hypothesis. Such imprecision can be accommodated by the present techniques in the following ways:

1. During the model construction phases, a viewpoint bounding box can be defined which include all the likely positions of the viewpoint.

2. During the model construction phase, a 3D model is generated based on the vision data. However, if the exact locations and shapes of entities such as edges and patches are uncertain, the entities may be approximated by the bounding boxes which contain all their likely locations.

3. Based on the hypothesized model, the invisibility and visibility techniques are carried out to compute totally visible surfaces, totally invisible surfaces and surfaces whose visibility cannot be determined.

4. The totally visible surfaces correspond to the vision data whose information is relatively explicited. Such data may be treated as successfully interpreted or more cursorily checked. Areas on the fuzzy projection box which are projected onto by surfaces whose visibility cannot be determined correspond to the vision data which are more obscured. The areas on the image plane corresponding to these areas are further analyses.

5. In the next round of analysis, the hypothesis becomes more refined. The viewpoint bounding box and bounding boxes of entities may be accordingly shrunken.

Figure 13C:
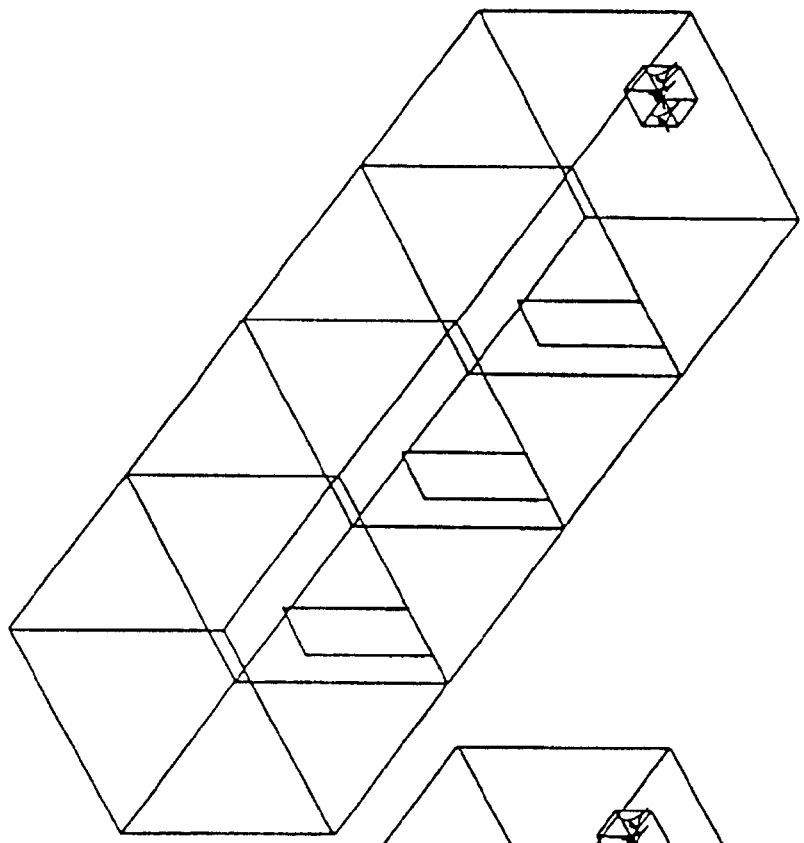
FIGS. 13A, 13B and 13C show respectively one, two and four room models used in testing the preferred embodiment.
Figure 13B:
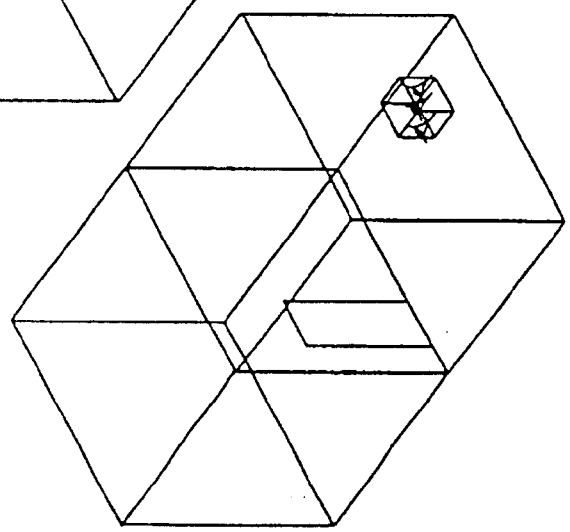
Figure 13A:
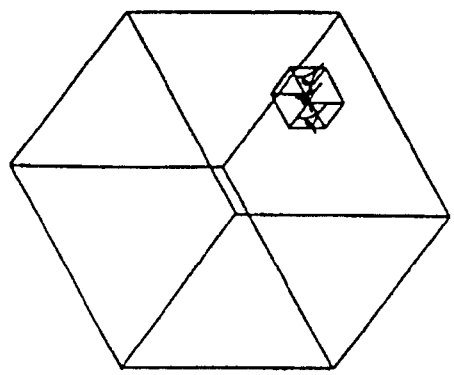

The preferred embodiment has been implemented on a general purpose computer adapted via programming in the C-language and tested using a set of models which differ in depth complexity. Three of the models are shown in FIGS. 13A, 13B and 13C. The visible surface computations have been computed for five nearby viewpoints. The times of hidden surface computations under different pixel and patch resolutions have been measured and are shown below.

EXAMPLE 1

Coarse patches, coarse screen pixels (400×400 pixels), resolution of fuzzy buffer: 400×400 pixels

| | Normal Hidden Surface Removal | | Fuzzy Hidden Surface Removal | | |
|---|---|---|---|---|---|
| Model | CPU time for 5 viewpoints (sec) | Total Patches | CPU time for fuzzy computations(sec) | CPU time for 5 viewpoints (sec) | Patchs invisible |
| 1 room | 11.2 | 10807 | 1.2 | 11.1 | 157 |
| 2 room | 21.8 | 19137 | 2.1 | 17.3 | 3942 |
| 3 room | 35.7 | 27467 | 2.9 | 23.9 | 9041 |
| 4 room | 46.3 | 35797 | 3.6 | 25.6 | 16140 |

EXAMPLE 2

Coarse patches, fine screen pixels (1000×1000 pixels), resolution of fuzzy buffer: 400×400 pixels

| | Normal Hidden Surface Removal | | Fuzzy Hidden Surface Removal | | |
|---|---|---|---|---|---|
| Model | CPU time for 5 viewpoints (sec) | Total Patches | CPU time for fuzzy computations(sec) | CPU time for 5 viewpoints (sec) | Patchs invisible |
| 1 room | 20.7 | 10807 | 1.2 | 20.7 | 157 |
| 2 room | 40.8 | 19137 | 2.1 | 32.4 | 3942 |
| 3 room | 56.4 | 27467 | 2.9 | 37.8 | 9041 |
| 4 room | 72.9 | 35797 | 3.6 | 40.0 | 16140 |

EXAMPLE 3

Fine patches, coarse screen pixels (400×400 pixels), resolution of fuzzy buffer: 400×400 pixels

| | Normal Hidden Surface Removal | | Fuzzy Hidden Surface Removal | | |
|---|---|---|---|---|---|
| Model | CPU time for 5 viewpoints (sec) | Total Patches | CPU time for fuzzy computations(sec) | CPU time for 5 viewpoints (sec) | Patchs invisible |
| 1 room | 25.0 | 21263 | 2.0 | 24.1 | 1605 |
| 2 room | 41.1 | 38293 | 2.5 | 25.0 | 15301 |
| 3 room | 60.6 | 55323 | 3.4 | 29.1 | 28712 |
| 4 room | 80.7 | 72353 | 4.6 | 33.8 | 42103 |

EXAMPLE 4

Fine patches, fine screen pixels (1000×1000 pixels), resolution of fuzzy buffer: 400×400 pixels

| | Normal Hidden Surface Removal | | Fuzzy Hidden Surface Removal | | |
|---|---|---|---|---|---|
| Model | CPU time for 5 viewpoints (sec) | Total Patches | CPU time for fuzzy computations(sec) | CPU time for 5 viewpoints (sec) | Patchs invisible |
| 1 room | 42.0 | 21263 | 2.0 | 40.5 | 1605 |
| 2 room | 75.9 | 38293 | 2.5 | 45.4 | 15301 |
| 3 room | 111.3 | 55323 | 3.4 | 53.8 | 28712 |
| 4 room | 148.3 | 72353 | 4.6 | 61.9 | 42103 |

The above results indicate that the overhead of the preferred embodiment is low. It also indicates that substantial computation savings can be achieved when the depth complexity of the models is high. There are a number of advantages to be gained by applying the strategies in the disclosed embodiments. Firstly, they do not have the restrictions encountered by the earlier hidden surface algorithms. For example, they do not preclude the presence of intersecting surfaces or patches in the environment. In addition, surface patches can be curved and the scene need not be static. The method also has very little computational overhead. Because it operates on a z-buffer, it can be easily implemented in hardware.

The preferred embodiment can be further enhanced using heuristics. In applications such as the interactive walk-through of the interior of a building, the surfaces most likely to form large crisp (non-fuzzy, umbra) regions are those representing walls, floors and ceilings. Therefore, only the crisp regions of these surfaces need to be scan-converted to the fuzzy buffer.

In addition to reducing hidden surface removal computations, the preferred method can also be used in the radiosity method. Currently the radiosity method is very slow, mainly because it needs to compute the visibility of surfaces for a large number of surface points to determine the form-factors. However, by grouping these points and treating them as groups of viewpoints, the preferred embodiment can be Used to determine surfaces totally visible to a group of these points. The fuzzy computations for each viewpoint bounding box is apportioned among all viewpoints in the box. Because there would be viewpoint for every surface point, the density of viewpoints in each viewpoint bounding box could be very high. Therefore, the advantage of using the method in the radiosity method can be more than in the normal hidden surface removal. The methods disclosed can also be used in virtual reality applications and other applications where abstract data is utilized. In the future such an application would need to display complex and dynamic environments in real time using the radiosity method. With the addition of a time dimension, the density of viewpoints in each viewpoint bounding box could be an order of magnitude higher than that of the radiosity method. Consequently, the methods disclosed could substantially speed up these applications. Other applications include the manipulation of physical data sue as the generation, processing and display of scientific data such as energy spectra data.

The foregoing describes only a number of embodiments of the present invention and modifications, obvious to those skilled in the art, can be made thereto without departing from the scope of the present invention.

APPENDIX 1

The Detection of Patches Front-Facing to a Viewpoint Bounding Box Referring to FIG. 2, whether a patch PT is facing a viewpoint VP can be determined by the angle A between the normal N of the patch PT and the view vector VV. The latter is the vector from the viewpoint VP to the centre of the patch PT The cosine of the angle is:

$$\cos A = N \cdot (PO - VP) * k$$
$$= k(Nx(x' - x) + Ny(y' - y) + Nz(z' - z))$$
$$= k(Nxx' + Nyy' + Nzz' - Nxx - Nyy - Nzz)$$

where VP=(x, y, z) is the position of the viewpoint, N=(Nx, Ny, Nz) is the unit normal of the patch, and PO=(x', y', z') is the position of the patch centre. k is a positive coefficient which turns the view vector (VV=PO−VP) into a unit vector.

If the patch PT is facing the viewpoint bounding box BB, the angle A must be obtuse. Hence cosine A must be negative for every possible viewpoint VP in the box. To check this, the maximum value of the cosine of A is found. If it is positive, then the patch would be back-facing to certain viewpoints in the bounding box.

Since PO and N are constant vectors, the maximization of cosine A requires each of Nx x, Nyy and Nz z to be minimized. Depending on the signs of the components of N, either the maxima or the minima of x, y and z are used. These coordinates correspond to the locations of the corners of the current viewpoint bounding box.

If a patch moves or rotates over time and the viewpoint bounding box contains viewpoints at different times, then the smallest cosine A at each instance of time may be computed and the smallest of them chosen. Patches with bounding volumes inside or intersecting the viewpoint bounding box are always treated as not front-facing. These patches can be detected by an initial bounding volume check.

Figure 11B:
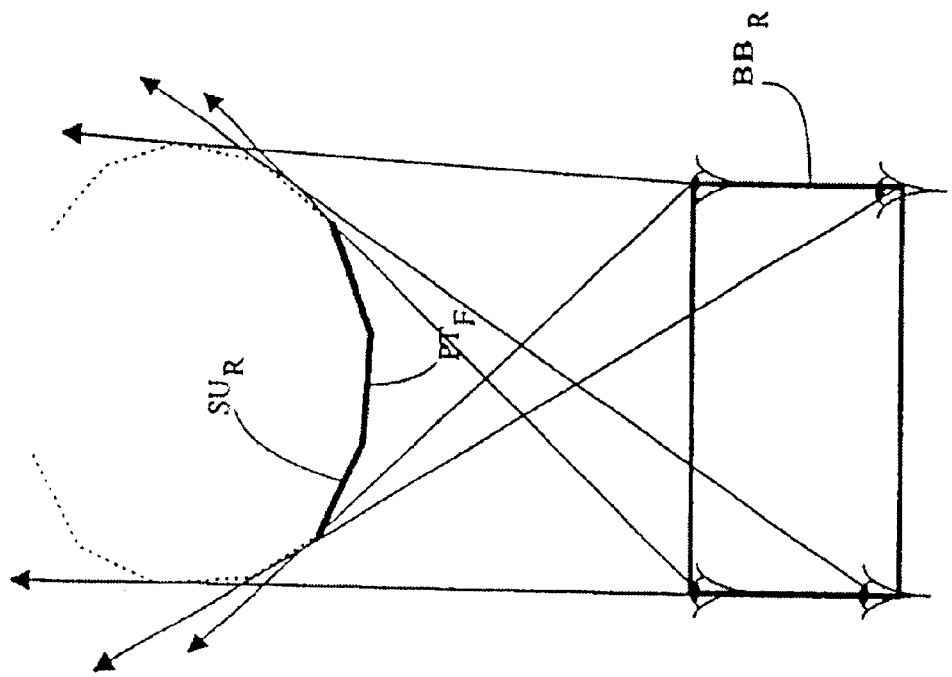
FIGS. 11A and 11B show views of a front-facing surface region.
Figure 11A:
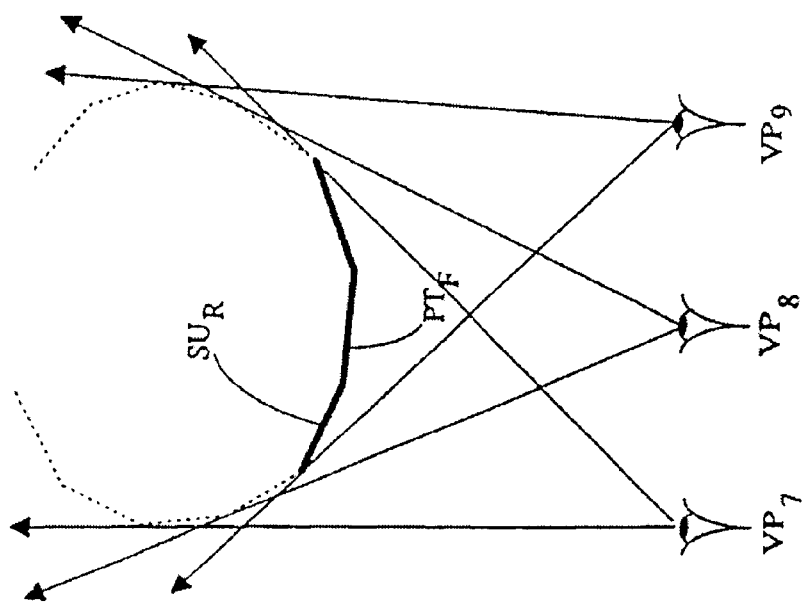

FIG. 11A shows a cut-plane view of a surface region $SU_R$ front-facing a set of viewpoints $VP_7$, $VP_8$, $VP_9$ and FIG. 11B shows the same surface region front-facing to a viewpoint bounding box $BB_R$.

Since the front-facing-patches $PT_P$ are facing all possible viewpoints in the box $BB_R$, the region $SU_R$ never curves back and is always facing these viewpoints. The view projections of the border of the region $SU_R$ therefore always enclose its projection. This property can be used in subsequent fuzzy projection computations.

Figure 12C:
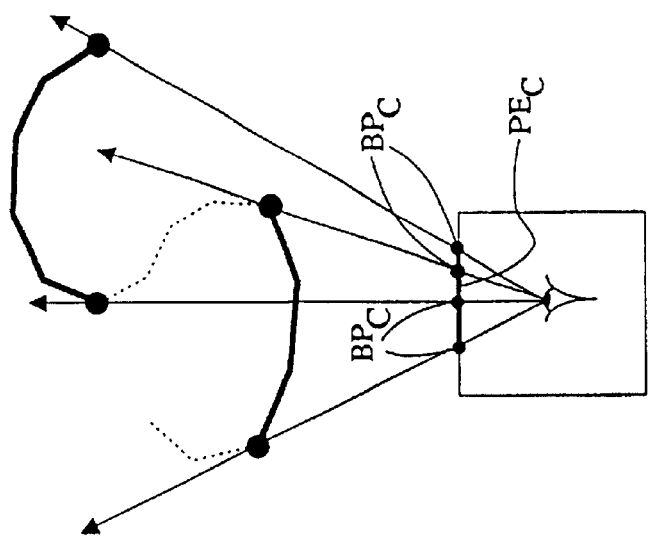
FIGS. 12A, 12B and 12C show cut-plane views of the projection of surface regions.
Figure 12B:
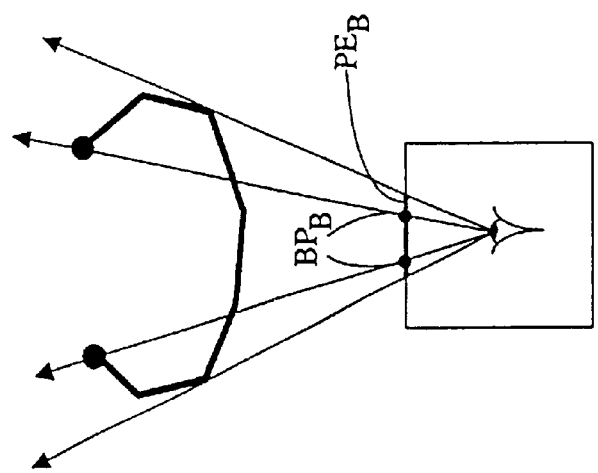
Figure 12A:
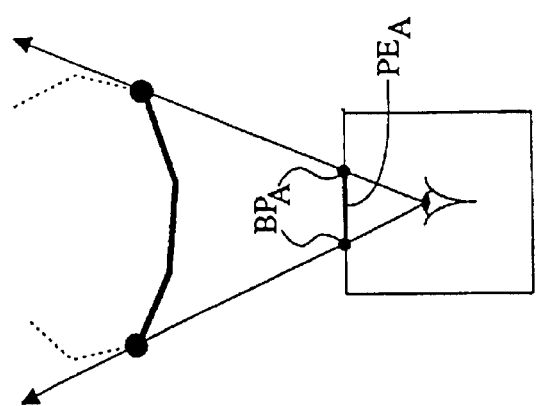

FIGS. 12A–12C show cut-plane views of projections of surface regions front facing to a group of viewpoints and their respective bounding boxes.

In FIG. 12A if all patches $PT_A$ in a surface region are front facing, the projections $SP_A$ of the boundary edges of the region always surround the projection $PE_A$ of that region.

In FIG. 12B if some surface patches $PT_A$ in a surface region are not front facing, the region may curve back. The projections $BP_B$ of the boundary edges of the region may be inside the projection $PE_B$ of that region.

In FIG. 12C the projection $BP_C$ of the boundary of each front-facing region of a convoluting surface still encloses the projection $PE_C$ of the region.

APPENDIX 2

The Computation of the Fuzzy Extent of Boundary Edges and Patches

As shown in FIG. 2, the projection coordinates PR (X, Y) of a point PO (x', y', z') to a viewpoint VP(x, y, z) on the projection plane PP facing the positive z direction is $$X=(x'-x)*d/(z'-z) \quad (1)$$

$$Y=(y'-y)*d/(z'-z) \quad (2)$$

where d is the shortest distance from the viewpoint to the projection plane facing the z direction.

To maximize X and Y. the minimum values of x and y are used. If X and Y are to be minimize, the maxima of x and y are used. Since z is part of the divisors, whether to use its maximum or minimum value depends on the signs of (x'−x) and (y'−y) after choosing the extreme values of x and y. Since the edges of the viewpoint bounding box are parallel to the axes, viewpoints having these extreme x, y and z values are at the corners of the box.

According to equations (1) and (2), the points which have the extreme values in x', ye and z' would yield the maximum and minimum projections. However, these points might not be on the current projecting entity, which can be a boundary edge or a patch.

To overcome the problem, the bounding volume of the entity is used to approximate that entity. Its projections can be used as an estimation as they enclose the projections of that entity.

Sometimes an entity may be subdivided into sub-entities. Its position and shape may also be non-static over time or uncertain. Hence the bounding volume of an entity should be a volume that encloses all the space it is likely to occupied, and all the bounding volumes of its sub-entities that are likely to be considered.

Hence the bounding volume of an entity should enclose all its sub-entities that are likely to be considered in the computations. Following the derivations above, the maxima of x' and y' and the minima of x and y are used to maximize the projections. Whether to maximize or minimize (z'−z) depends on the signs of (x'−x) and (y'−y). If these terms are positive, the term should be minimized. Hence the smallest z' and the largest z are used. Otherwise, the largest e' and the smallest z are instead chosen.

The finding of the minimum projections is the opposite of maximization. Hence the decisions to minimize or to maximize the individual terms are accordingly changed.

Having obtained the projections which give the maximum and minimum X and Y values, these projections are mapped to the fuzzy projection plane FP whose normal is toward the z direction.

A rectangle on the plane with these projections as corners and with edges parallel to the edges of the corresponding fuzzy projection face FF can be defined. They are either rounded up or down to create another region which contains the original rectangle and all the pixels under it. This is the fuzzy extent EF of the patch on the fuzzy projection plane FP.

By rotating the axes, the same equations (1) and (2) can be used for projection planes facing other directions if the terms in equations (1) and (2) are accordingly permuted. The fuzzy extents corresponding to these planes can then be similarly obtained.

If a patch is within the viewpoint bounding box, then for some viewpoints z' is smaller than or equal to z in equations (1) and (2). The fuzzy extents would then extend to infinity in the directions which can be determine by the signs of the denominators and numerators in these equations.

APPENDIX 3

The Computation of the Non-Fuzzy Regions

To compute the non-fuzzy region, it is first necessary to obtain its relationship with the fuzzy boundary region and one of the projection regions.

Consider two viewpoints in the current viewpoint bounding box and a point on a fuzzy projection plane. Assume that the projection of the front-facing sub-surface at one viewpoint maps on that point and at the other viewpoint does not map on that point.

Because the change of projection status can only occur at the projections of boundary edges, on a curve joining the two points there must exist another viewpoint such that the projection of a boundary edge from it would map on the same point on the fuzzy projection plane. Since this curve can be totally inside the current viewpoint bounding box, that point must be within the fuzzy region of the boundary edges for that bounding box.

If a point on a fuzzy projection plane is within the mapping of a projection region of the front-facing sub-surface, and if it is outside the fuzzy region of the boundary edge, then the point is always within the projection regions of the sub-surface for all the viewpoints in the current viewpoint bounding box. The point is by definition inside the non-fuzzy region. Since the fuzzy boundary region is always within the area containing the fuzzy extents of boundary edges, the point is still inside the non-fuzzy region if the former is approximated by the latter.

Based on the above, the approximated non-fuzzy region can be obtained by finding the projection region of the front-facing sub-surface from a viewpoint in the current viewpoint bounding box, projecting it to the fuzzy region, and subtracting all its area intersected with the fuzzy extents of the boundary edges. A modified scan line algorithm may be used for this task.

First, an arbitrary viewpoint in the current viewpoint bounding box is selected. Usually the centre of the bounding box is chosen. This viewpoint is called the chosen viewpoint. The projection coordinates of the edges in the front-facing sub-surface from this viewpoint are found.

Since the projection coordinate system and the fuzzy projection coordinate system have one-to-one mapping, the mapping of the former to the latter is trivial.

This is followed by the computations of the fuzzy extents of the patches described in Appendix 2.

Figure 8A:
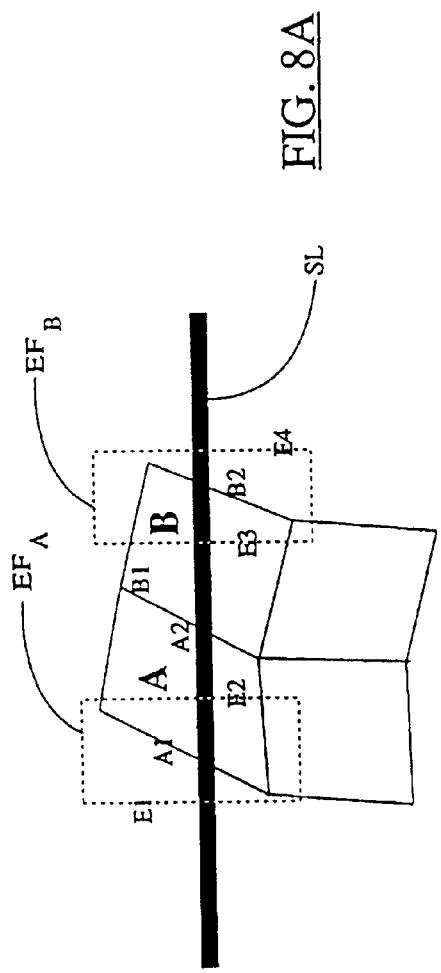
FIGS. 8A to 8D show the scan-conversion of the non-fuzzy regions.

An illustration of such an arrangement is shown in FIG. 8A where two patches A and B intersect a scan line SL and have respective fuzzy extents $EF_A$ and $EF_B$ of their boundary edges.

Two active edge lists are maintained during the processing of scan lines. The first list contains the active edges of the patches. The second list contains the pairs of active vertical edges of the fuzzy extents of boundary edges.

In FIG. 8A, the first active edge list is:

A1 A2 B1 B2 the second active edge list is:

E1 E2 E3 E4

During the processing of successive scan lines, entries in the list are added when they become active in the current scan line. They are deleted from the list when the last scan lines they are active have been processed.

A scan line array with as many elements as the number of horizontal elements in the current fuzzy array is maintained. Each element of the array contains a depth field and a boolean field called the overlap indicator. The depth field is used to store the depth of the patch whose fuzzy extent surrounds the fuzzy element. The overlap indicator indicates whether the element is under the non-fuzzy region. The depth fields are initialized to negative infinity. The overlap indicators are set to zero.

The pairs of edges in the first active edge list are then processed. The span of each pair of these edges represents the segment of a patch in the current scan line. The overlap indicators of the elements within the span are set to one. The value stored in the depth field of each of these elements is compared with the depth of the patch with respect to the chosen viewpoint. It may be approximated by the maximum depth from the viewpoint to the patch or the patch bounding box. If the former is smaller, it is replaced by the latter.

The computation of the segments of patches requires the finding of the intersections between the current scan line and the active edges. This computation can be avoided by using the leftmost or rightmost position of each edge depending on whether it is at the left or right side of the span. This inaccuracy is allowed because it is always offset by the fuzzy extents of the boundary edges.

The pairs of active edges in the second active edge list are then accessed. The span of each pair represents the segment of the fuzzy extent of a boundary edge in the current scan line. All the overlap indicators of the elements within the span are reset to zero.

After all the records in the active edge lists have been processed, the elements in the scan line array where the overlap indicators are one are within the segment of the non-fuzzy region in the current scan line. The depth fields contain the maximum possible depth of the region in the viewing directions represented by these elements.

The depth stored in each element of the array is compared with the depth field of the corresponding element in the fuzzy buffer. If the latter is larger, it is replaced by the former.

Figure 8B:
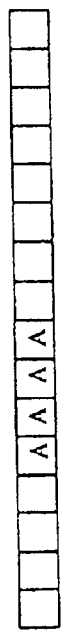
Figure 8C:
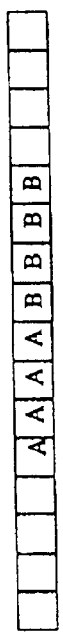
Figure 8D:
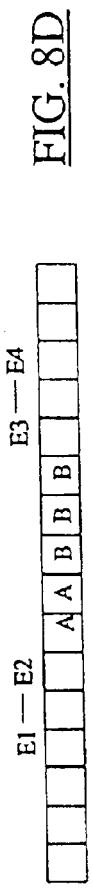

Returning to the FIGS., FIG. 8B shows the scan line array after scan-conversion of the active edges of patch A. FIG. 8C shows the scan-conversion of the active edges of patch B. FIG. 8D shows the scan line array after the elements within the fuzzy extents $EF_A$ and $EF_B$ of the boundary edge have been reset.

APPENDIX 4

The Scan-conversion of the Fuzzy Regions

To obtain the fuzzy regions, a modified scan line algorithm to that of Appendix 3 is used.

An active edge list is maintained during the processing of scan lines. The list contains pairs of vertical edges of the fuzzy extents of patches active in the current scan line. During the processing of successive scan lines, entries in the list are added when they become active in the current scan line. An entry is deleted from the list when the last scan line it is active has been processed.

Figure 9A:
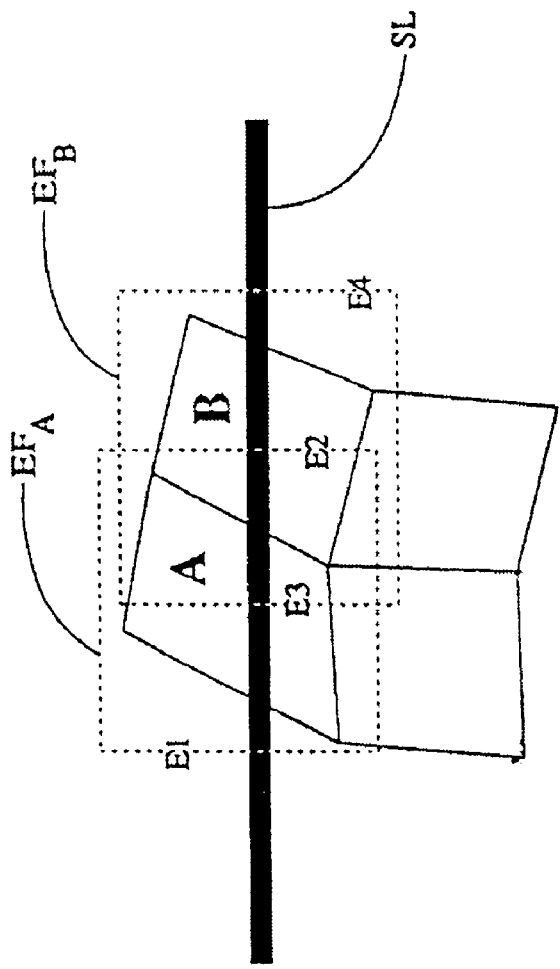
FIGS. 9A to 9C show the scan-conversion of the fuzzy regions.

For the arrangement of FIG. 9A (similar to FIG. 8A, but for fuzzy regions), the active edge list is:

E1 E2 E3 E4.

A scan line array with as many elements as the number of horizontal elements in the current fuzzy array is maintained. Each element of the array is a boolean field called the overlap indicator which indicates whether the element is under the fuzzy region.

For each scan line, the entries in the active edge list are accessed. The span between each pair represents the segment of the fuzzy extent of a patch in the current scan line. All the overlap indicators of the elements within the span are set to one.

After the processing of the entries in the active edge list. The array elements whose overlap indicators are one now contain the segment of the fuzzy region in the current scan line.

Figure 9B:
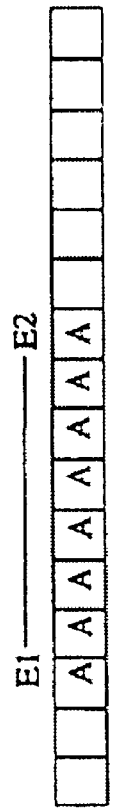

FIG. 9B shows the state of the scan line array after the elements within the fuzzy extent $EF_A$ of patch A have been updated.

Figure 9C:
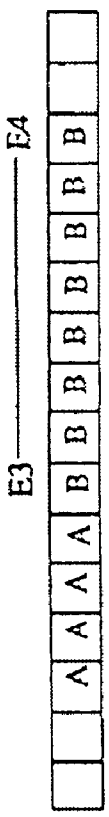

FIG. 9C shows the state of the scan line array after the elements within the fuzzy extent $EF_B$ of patch B have been updated.

APPENDIX 5

Using a Cache to Speed UD the Access and Writing of Fuzzy Elements Within the Fuzzy Extent of a Patch The fuzzy buffer methods described herein require the reading and writing of the fuzzy elements within the fuzzy extent of each patch. Since there are usually substantial overlaps between the fuzzy extents of adjacent patches, the access and update of these elements can be reduced by storing their information in high speed cache.

Figure 10:
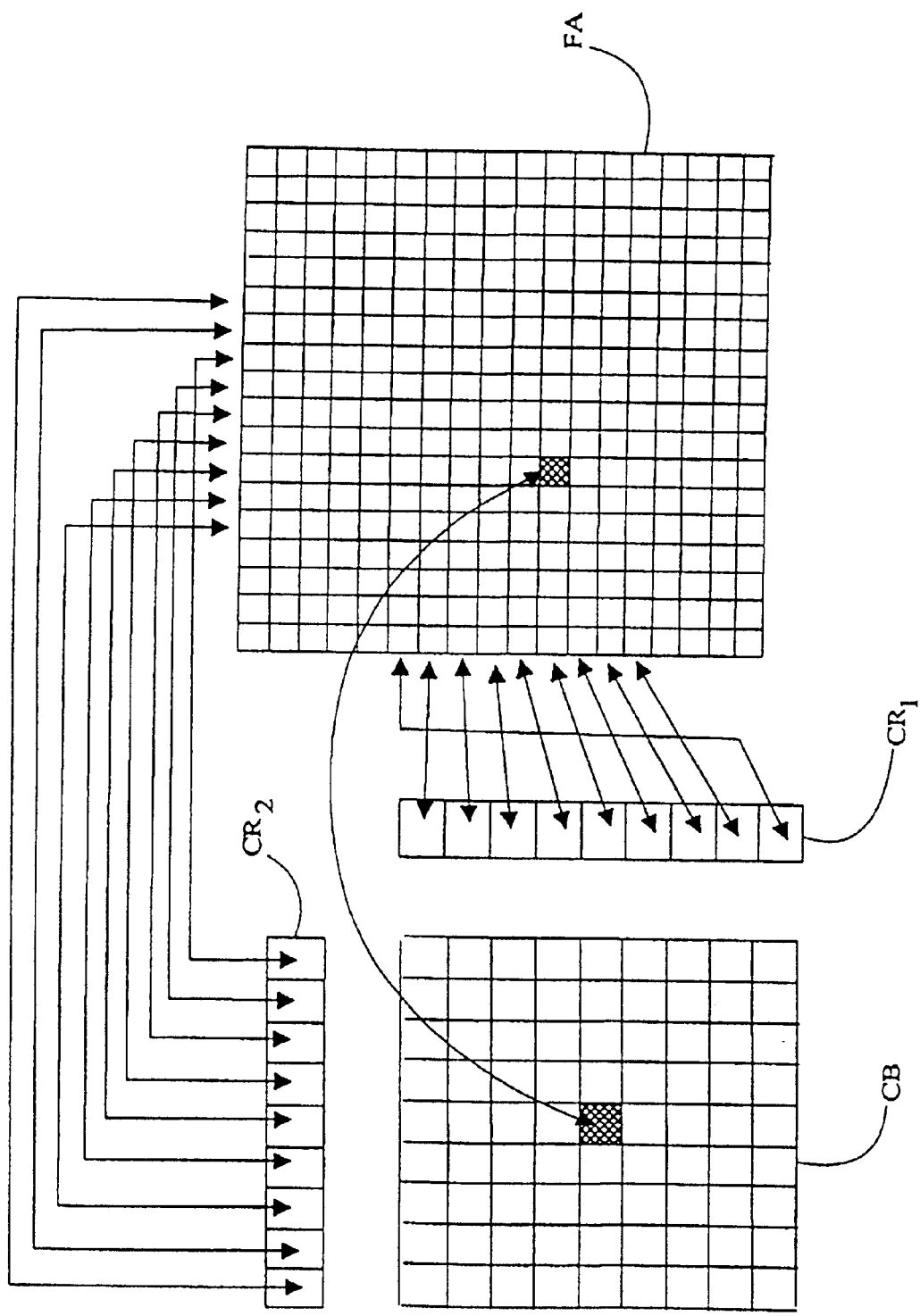
FIG. 10 illustrates the mapping between a cache and the fuzzy array.

The cache may be in many forms. One example, shown in FIG. 10, is to use a cache buffer CB and two cross-reference tables $CR_1$ and $CR_2$. The cache buffer CB is a 2D array, in which each element contains fields which are the mirror of the fields on a fuzzy buffer element that need to be read or written. The cross-reference tables $CR_1$ and $CR_2$
  respectively contain as many elements as the number of rows and columns in the 2D array. Depending on the array it is in, each element in the table contains either a row ($CR_1$) or a column ($CR_2$) field which is used to cross-reference the rows and columns of the 2D array with the rows and columns of the current fuzzy array FA. For each element in the cache, the cross-reference tables $CR_1$ and $CR_2$ contain a reset switch to indicate whether it has been reset.

Initially, all the reset switches are initialized to one. The centre of the cache buffer CB is mapped to the centre of the fuzzy extent of the first patch to be read. After the fuzzy elements within the fuzzy extent of the first patch are read, information in these elements are stored in the cache buffer CB elements according to the mapping. The mappings of rows and columns in the cache are updated into the cross reference table $CR_1$ and $CR_2$, respectively. The reset switch in the updated elements in these table and the cache buffer CB are set to zero. Before reading the fuzzy elements within the fuzzy extent of the second patch, data in the cache buffer CB is first read. If an element has already been stored in the cache buffer CB, no access to the cache buffer CB to obtain its information is necessary.

To maximize the efficiency of the cache, any adjacent patch is accessed first. After the processing of a series of patches, there may be a patch whose mapping covers the boundary of the cache. The affected rows or columns are wrapped around. The rows at the opposite edges become the next rows or columns for the patch.

Before the writing of the patch data into the cache buffer CB each element in the cross-reference table $CR_1$ and $CR_2$ within the rows of the columns of the current patch mapping are checked. If the reset switch is on or if the mapping value conforms to the current mapping the whole row or column of cache elements have not been used and there is no problem in using them. Otherwise the row or the column needs to be reclaimed. The original data in the whole row or column of cache elements are written back to the fuzzy buffer and then initialized. The affected element in the cross-reference table is updated with the new mapping. After that the patch data can then be written into these newly-reclaimed cache elements.

The writing from the cache buffer CB to the fuzzy buffer can be performed in burst mode. Hence when such task occurs several adjacent rows or columns of the cache elements may be written to the fuzzy buffer and re-initialized even though some of the elements may not need to be re-claimed.

APPENDIX 6

Direct Computation of the Fuzzy Reqion of an Edge

Assume that the equation of the edge is expressed as:

$$x=az+b \qquad (1)$$

$$y=cz+d \qquad (2)$$

2. Assume that all the coordinates of a viewpoint P in the current viewpoint bounding box is $(x_0\ y_0\ z_0)$.

3. The image projection of a point T (x y z) on the edge with respect to P is $$X = D\frac{x - x_0}{z - z_0} \qquad (3)$$

$$Y = D\frac{y - y_0}{z - z_0} \qquad (4)$$

4. Since (x y z) and $(x_0\ y_0\ z_0)$ are uncertain the region comprising all possible values of (X Y) forms an area which is the fuzzy region of the edge.

5. By substituting (2) into (4) and rearranging $$z = \frac{Dd - Dy_0 + Yz_0}{Y - Dc} \qquad (5)$$

If Y is known the extreme of z can be found by substituting the appropriate extreme of $y_0$ and $z_0$ into the above equation. All points on the edge having z within these extreme could project at Y from viewpoints in the current viewpoint bounding box.

6. Substituting (1) into (3)

$$X = D\frac{az + b - x_0}{z - z_0} \qquad (6)$$

Notice that in (6) there is no local extremum of X for changing z. Hence by assigning the extreme of z found from section 5 and the appropriate extreme values of $x_0$ and $z_0$ into (6) the two extreme of X can be found. These values correspond to the maximum and minimum possible X for a particular value of Y.

7. A scan line approach can be used to approximate the fuzzy region of the edge. Substituting (2) into (4) and rearranging $$Y = D\frac{cz + d - y_0}{z - z_0} \qquad (7)$$

By assigning the appropriate extreme values of z $y_0$ and $z_0$ into (7) the maximum and minimum values of Y are obtained. These values are rounded up and down respectively to cover all scan lines the edge may project onto. Each of these scan lines corresponds to a value of Y. From section 5 and 6 the maximum and minimum of X can be found. The area within these values is the scan line segment of the fuzzy region of the edge. The corresponding segment of the expanded fuzzy region of that edge is the further rounding of the segment to fully cover all the grid cells it projects cover.

The above technique computes the expanded fuzzy regions by scan-converting the segments of the regions on the X scan lines. For edges more horizontal than vertical the expanded fuzzy regions may be more accurately computed by scan-converting the segments of the regions on the Y scan lines.

Figure 14:
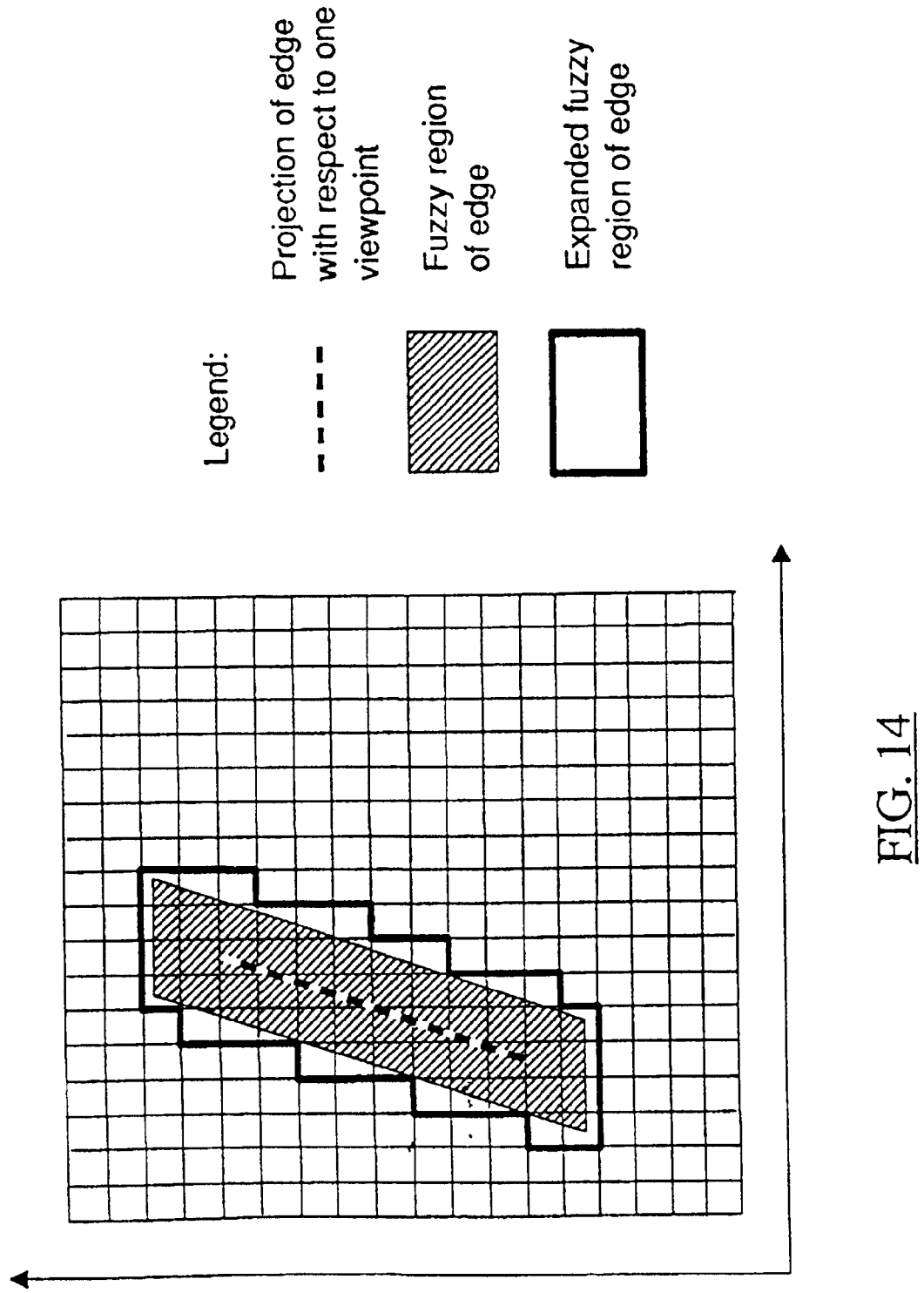
FIG. 14 illustrates the direct computation of the fuzzy region of an edge.

This is shown in FIG. 14 where the fuzzy region takes on a scan-line shape about the fuzzy region of the edge. This is substantially smaller than the fuzzy extent of the edge.

APPENDIX 7

Scan-conversion of Patches on the Hemicube Pyramid

This appendix describes an efficient technique for scan-converting a patch on a plane which contains cells with different resolutions. It can be used to compute the form-factor of patches in the radiosity method with or without the use of the fuzzy projection techniques.

The technique uses a data structure called the hemicube pyramid. Each level of the pyramid contains a set of 2D arrays. Each array corresponds to a level and a projection face. Each element of the array corresponds to a pixel on the plane. Note that the hemicube may be a prism rather than a cube and not all its planes need to be active.

An element in the array is called a pyramid element. In addition to the information needed in an original hemicube element it contains an sub-division indicator and a pointer. The sub-division indicator is initially set to OFF. The indicator becomes active if its level is less than the required accuracy level of patches projected onto it.

The pointer is used to link a pyramid element with one of the pyramid elements at the higher accuracy level and within its region. To enable more accurate sampling the elements to be linked are usually chosen such that an element accessed by the pointers from an element at the lower accuracy level is as close to the centre of the latter as possible.

Figure 15:
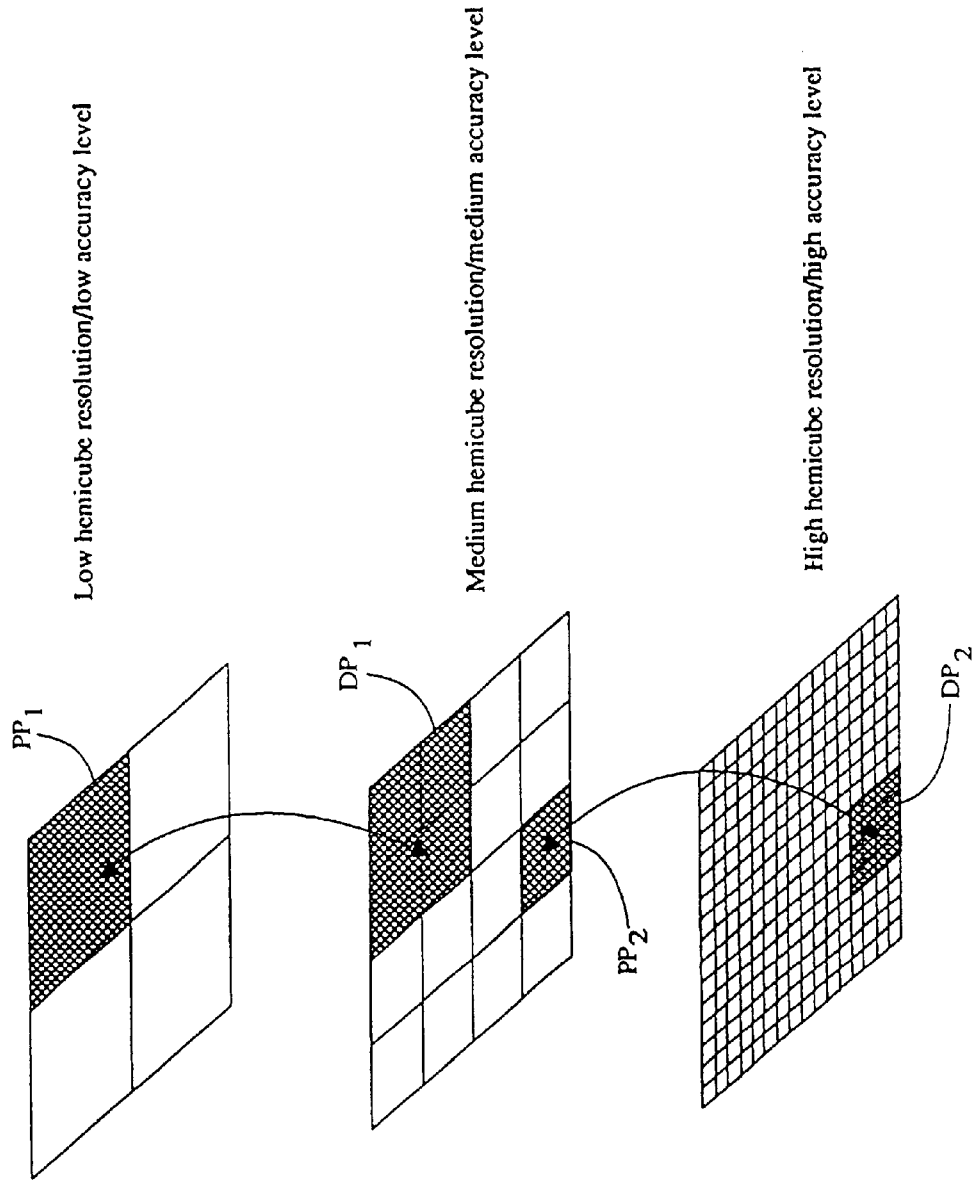
FIG. 15 shows a hemi-cube pyramid structure.

The organization of the hemicube pyramid corresponding to a face of the hemicube is shown in FIG. 15.

After the initialization of the hemicube pyramid patches are accessed in decreasing order of accuracy and scan-converted to the hemicube pyramid. This order of access ensures that patches are scan-converted in resolutions equal to or finer than their own optimal projection resolutions and the optimal projection resolutions of patches they might occlude.

For each projecting patch the hemi-cube projection resolution corresponding to its accuracy level is found. Each hemicube pyramid element belonging to that resolution and under The projection of that patch is accessed.

If the accessed element is already at the most accurate level, or if its sub-division indicator is not on, the ID of the current patch is written into the current element if that patch is closer than the so-far closest patch stored in the element, as in the normal hemicube scan-conversion. If this update occurs, all the ancestors of the current element until the element whose sub-division indicator has already been set to on are accessed. The sub-division indicator of each accessed element is set to on.

Note that the recursive access of ancestor elements can instead be carried out for all elements under the patch projection immediately after they have been found. However, if the possibility that patches are invisible is high, carrying out the recursion after determining that the patch is closer is more efficient as it does not need to be applied on elements if that patch is hidden.

If the sub-division indicator of the current element is ON, patches requiring more accurate form-factor evaluation have been projected onto the element. Therefore, each of its daughter elements under the projection of the current patch is accessed and the above computations are repeated.

After the scan-conversion of all projecting patches, the elements in all the levels are scanned. From the projection information stored in these elements, the form factors of the patches are computed.

If highly accurate form-factor computations and hence very high hemi-cube resolutions are required, relatively large amounts of memory are needed to store the hemi-cube arrays. The initialization and scanning of these arrays for form-factor accumulation is also costly.

Since patches requiring very fine projections are relatively few, the above problem can be overcome by using sparse matrices to store active (sub-divided) elements corresponding to high resolution levels. Each matrix is a one-dimensional array. Active elements are stored in it at positions determined by a hashing function parameterized by pixel positions.

High accuracy form-factor computations can also be achieved using ray-tracing in conjunction with hemicube computations. All the patches are still scan-converted to the hemicube pyramid or the normal hemicube. However, the scan-conversion of patches requiring high accuracy in form-factor computations is only used to determine how other patches are blocked by them. Instead, their form-factors are determined by tracing rays from them.

The content of the hemicube pyramid can be used to speed up the ray-tracing. During the scan-conversion of a patch that is also ray-traced, patches stored in the buffer that are closer to it are determined. When ray-tracing it, these patches may be tested with the rays first as they are more likely to block these rays.

APPENDIX 8

References

1. Aggarwal J. K., "Dynamic Scene Analysis," in "Image Sequence Processing and Dynamic Scene Analysis," Huang, T. S. (Eds,) 1981, Springer-Verlag, pp. 40–73.
2. Appel A. "The Notion of Quantitative Invisibility and the Machine Rendering of Solids", Proc. of the ACM National Conference, 1967, Thompson Books , Washington D.C., pp.387–393.
3. Baum, D. R., Rushmeier H. E., Winget J. M., "Improving Radiosity Solutions through the use of Analytically Determined Form-factors", Computer Graphics, Vol 23 No. 3, 1989, pp. 325–334.
4. Bradler, N., Tsotsos, J. K., (Eds) "Motion: Representation and Perception," North-Holland, 1986.
5. Catmull, E. "A Subdivision Algorithm for Computer Display of Curved Surfaces", PhD Thesis, Report UTEC-CSc-74, University of Utah, 1975.
6. Chang, S. S. L., Zadeh, L. A., "On Fuzzy Mapping and Control," IEEE Transactions on Systems, Man, and Cybernatics, Vol. SMC-2, No. 1, January 1972, pp. 30–34.
7. Cohen, M. F., D. P. Greenberg, "The Hemi-Cube: A Radiosity Solution for Complex Environment," SIGGRAPH 85, pg. 31–40.
8. Cohen, M. F., Chen, S. E., Wallace, J. R., Greenberg, D. P., "A Progressive Refinement Approach to Fast Radiosity Image Generation," SIGGRAPH 88, pg. 75–84.
9. Crocker, G. A., "Invisibility Coherence for Faster Scan-Line Hidden Surface Algorithms," SIGGRAPH'84, pp. 315–321.
10. Fournier, A., Fussell, D., "On the power of the Frame Buffer,", ACM Transactions of Graphics, April 1988, pp. 103–128.

11. Fuch, H., Kedem, Z., Naylor, B. F., "On Visible Surface Generation by A Priority Tree Structures," SIGGRAPH'80, pp. 124–133.
12. Gordon, D., "Front-to-Back Display of BSP Trees," IEEE CODA, September 1991, pp. 79–85.
13. Haines, E. A., Wallace, J. R., "Shaft Culling for Efficient Ray-Traced Radiosity," unpublished paper, July 1991.
14. Hornung, C. "A Method for Solving the Visibility Problem", IEEE Computer Graphics and Applications, July 1984, pp. 26–33
15. Hubschman, H., Tucker, S. W., "Frame-to-Frame Coherence and the Hidden Surface Computation: Constraints for a Convex World," SIGGRAPH 81, 45–54.
16. Impel, D. S., Cohen, M. F., "A Radiosity Method for Non-Diffuse Environments,", Computer Graphics, Vol. 4, 1986, pp. 133–142.
17. Jain, R., Haynes S., "Imprecision in Computer Vision," in "Advances in Fuzzy Sets, Possibility and Applications," Wang, P. (Ed), Plenum Press, 1983, pp. 217–236.
18. Kanatani, K., "Group-Theoretical Methods in Image Understanding," Springer Verlag, 1990.
19. Kaufmann, A., "Theory of Fuzzy Subsets, Vol. 1, Fundamental Theoretical Elements", Academic Press, 1975.
20. Ligomenides, P. A., "Modeling Uncertainty in Human Perception," in "Uncertainty in Knowledge-Based Systems," Bouchon, B., Yager, R. (Eds), Springer Verlag, 1986, pp. 337–346.
21. Lim, H. L., "Fast Hidden Surface Removal Through Structural Analysis and Representation of Objects and Their Contours," CGI'87, Japan, 1987, pp. 75–88.
22. Marks, J., Walsh, R., Christensen, J., Friedell, M., "Image and Intervisibility Coherence in Rendering", Proceedings of Graphics Interface'90, Toronto, Ontario, May 1990, pp. 17–30.
23. Recker, R. J., George D. W., Greenberg D. P., "Acceleration Techniques for Progressive Refinement Radiosity," Proceedings, 1990 Symposium on Interactive 3D Graphics, Snowbird, Utah, Computer Graphics, pg. 59–66.
24. Ruspini, E. H., "A New Approach to Clustering," Information Control, Vol. 15, pp. 22–32.
25. Siedlecki, W., Siedlecka, K., Sklansky, J., "Mapping Techniques for Exploratory Pattern Analysis," in "Pattern Recognition and Artificial Intelligence," Gelsema, E. S., Kanal L. N., (Eds), Elsevier Science, 1988, pp. 277–299.
26. Sillion, F., Puech, C., "A General Two-Pass Method Integrating Specular and Diffuse Reflection," SIGGRAPH 1989, pg. 335–344.
27. Subbarao, M., "Interpretation of Visual Motion: A Computational Study," Pitman, London, 1988.
28. Sutherland, I. E., Sproull, R. F., Schumacker, R. A., "A Characterization of Ten Hidden Surface Algorithms", Computing Surveys, Vol. 6, No. 1, 1974, pp. 1–55
29. Teller, S. J., "Visibility Preprocessing for Interactive Walkthrough," Computer Graphics, Vol. 25, No. 4, July 1991.
30. Wallace, J. R., Elmquist, K. A., Haines, E. A., "A Ray Tracing Algorithm for Progressive Radiosity", Computer Graphics, Volume 23, No. 3, July 1989, pp. 315–324.
31. Yee, L., "Spatial Analysis and Planning under Imprecision", North-Holland, 1988.
32. Zadeh, L. A., "Fuzzy Sets", Information and Control, Vol. 8, 1965, pp. 338–353.

What is claimed is:

1. A method of reducing the visibility related computations in 3-D computer graphics, the visibility related computations being performed on 3-D surfaces or their sub-elements, or a selected set of both, the method comprising:

identifying grid cells which are under or related to the projections or extents of projections associated with at least one of said 3-D surfaces or their sub-elements;

comparing data associated with said at least one of 3-D surfaces or their sub-elements with stored data associated with the grid cells;

determining which of said at least one of 3-D surfaces or their sub-elements is always invisible or always visible to a viewpoint or a group of viewpoints by projection based computations prior to a visibility computation; and ignoring said determined at least one of the 3-D surfaces or their sub-elements during said visibility computation.

2. The method of claim 1 wherein the projection based computations comprise:

defining one or more projection planes for generating projections with respect to a viewpoint or a group of viewpoints;

identifying regions on the projection planes that are or are related to the projections or the extents of projections associated with selected 3-D surfaces.

3. The method of claim 2 wherein said identifying step comprises dividing each projection plane into one or more grids; and storing the data of said projections on the grids in computer storage.

4. The method of claim 3 wherein said grid or grids are either regular or irregular.

5. The method of claim 3 wherein the structure of said computer memory is based on a z-buffer or a quadtree.

6. The method of claim 3 wherein some or all of said data are or are related to the depths of said 3-D surfaces or their sub-elements.

7. The method of claim 3 wherein some or all of said data are or are related to the shortest depths of said 3-D surfaces or their sub-elements.

8. The method of claim 3 wherein some or all of said data are or are related to the largest depths of said 3-D surfaces or their sub-elements.

9. The method of claim 1 wherein at least one of the data to be compared with said stored data is a value related to the depth value, the largest depth value, or the smallest depth value related to one of said 3-D surfaces or said sub-elements.

10. The method of claim 1 wherein said visibility related computations are speeded up by using cache memory.

11. A method of reducing a step of visibility computations in 3-D computer graphics from a perspective of a viewpoint, the method comprising:

computing, before said step and from said perspective, the visibility of at least one entity selected from 3-D surfaces and sub-elements of said 3-D surfaces, wherein said computing step comprises at least a comparison between a pair of depth-related numbers to determine which of the surfaces or the sub-elements of the surfaces associated with said numbers is closer to said viewpoint and said 3-D surfaces are arranged in a hierarchy represented by patches in varying levels of details; and skipping, at said step, at least an occlusion relationship calculation for at least one entity that has been determined to be invisible in said computing step.

12. A method of reducing a step of visibility computations in 3-D computer graphics from a perspective of a viewpoint, the method comprising:

computing, before said step and from said perspective, the visibility of at least one entity selected from 3-D surfaces and sub-elements of said 3-D surfaces, wherein said computing step comprises:

employing at least one projection plane for generating projections with said selected set of 3-D surfaces and said sub-elements with respect to said perspective;

identifying regions on said at least one projection plane, wherein said regions are related to the projections associated with said selected 3-D surfaces, said sub-elements, or bounding volumes of said 3-D surfaces or said sub-elements;

updating data related to said regions in computer storage; and deriving the visibility of at least one of said 3-D surfaces or said sub-elements from the stored data in said computer storage; and skipping, at said step of visibility computations, at least an occlusion relationship calculation for at least one entity that has been determined to be invisible in said computing step.

13. The method of claim 12, wherein at least one of said bounding volumes is a volume containing a 3-D surface, or a volume containing a 3-D surface and at least one of the sub-elements of said 3-D surface.

14. The method of claim 12, wherein at least one of said bounding volumes defines a space containing all likely occurrence of said 3-D surface, or said 3-D surface and at least one of said sub-elements.

15. The method of claim 12, wherein said identifying step comprises:

dividing each projection plane into at least one grid; and identifying the cell or cells of said at least one gird which are related to each of said regions or extents of said regions.

16. The method of claim 15, wherein said at least one grid is regular.

17. The method of claim 16, wherein the structure of said computer storage is based on a z-buffer.

18. The method of claim 15, wherein said at least one grid is irregular.

19. The method of claim 18, wherein the structure of said computer storage is based on a quadtree.

20. The method of claim 12, wherein said updating step comprises:

performing a depth comparison test between data associated with each of said identified cell or cells with said stored data in an element of said computer storage, wherein said element is the one associated with said cell; and if said test indicates that update is necessary for said cell, writing said data associated with said cell into said associated element.

21. The method of claim 20, wherein the data to be compared with said stored data is related to the depth of one of said 3-D surfaces or one of said sub-elements of said 3-D surfaces, wherein the projection region or the extent of projection region of said one of said 3-D surfaces or said one of said sub-elements of said 3-D surfaces is related to said cell.

22. The method of claim 20, wherein the data to be compared with said stored data is related to the shortest depth of said 3-D surface or said sub-element.

23. The method of claim 20, wherein the data to be compared with said stored data is related to the largest depth of said 3-D surface or said sub-element.

24. The method of claim 20, wherein the data to be compared with said stored data is related to the bounding volume associated with said 3-D surface or said sub-element.

25. The method of claim 24, wherein at least one of said bounding volume is a volume containing a 3-D surface, or a volume containing a 3-D surface and at least one of the sub-elements of said 3-D surface.

26. The method of claim 24, wherein at least one of said bounding volumes defines a space containing all likely occurrence of said 3-D surface, or said 3-D surface and at least one of said sub-elements.

27. The method of claim 12, wherein said computer storage is accelerated by cache memory.

28. A method of reducing visibility computations in 3-D computer graphics, the method comprising:

computing the visibility of a set of entities selected from 3-D surfaces and sub-elements of said 3-D surfaces from the perspective of a group of a plurality of viewpoints, wherein said computing step comprises at least a comparison between a pair of depth-related numbers to determine which of the surfaces or the sub-elements of the surfaces associated with said numbers is closer to said group of a plurality of viewpoints and said 3-D surfaces are arranged in a hierarchy represented by patches in varying levels of details; and skipping at least an occlusion relationship calculation at subsequent steps of visibility computations for at least one entity Eat has been determined to be invisible in said computing step, wherein said visibility computations in each step is from the perspective of each viewpoint from said group, or from the perspective of each subset of viewpoints from said group.

29. A method of reducing visibility computations in 3-D computer graphics, the method comprising:

computing the visibility of a set of entities selected from 3-D surfaces and sub elements of said 3-D surfaces from the perspective of a group of a plurality of viewpoints, wherein said computing step comprises:

employing at least one projection plane for generating projections with said selected set of 3-D surfaces and said sub-elements with respect to the perspective of a group of a plurality of viewpoints;

identifying regions on said at least one projection plane, wherein said regions are related to the projections associated with said selected 3-D surfaces, said sub-elements, or bounding volumes of said selected 3-D surfaces or said sub-elements from said perspective;

updating data related to said regions in computer storage; and deriving the visibility of at least one of said 3-D surfaces or said sub-elements from the stored data in said computer storage; and skipping at least an occlusion relationship calculation at subsequent steps of visibility computations for at least one entity that has been determined to be invisible in said computing step, wherein said visibility computations in each step is from the perspective of each viewpoint from said group, or from the perspective of each subset of viewpoints from said group.

30. The method of claim 29, wherein at least one of said bounding volumes is a volume containing a 3-D surface, or a volume containing a 3-D surface and at least one of the sub-elements of said 3-D surface.

31. The method of claim 29, wherein at least one of said bounding volumes defines a space containing all likely occurrence of said 3-D surface, or said 3-D surface and at least one of said sub-elements.

32. The method of claim 29, wherein said identifying step comprises:
dividing each projection plane into at least one grid; and
identifying the cell or cells of said at least one grid which are related to each of said regions or extents of said regions.

33. The method of claim 32, wherein said at least one grid is regular.

34. The method of claim 33, wherein the structure of said computer storage is based on a z-buffer.

35. The method of claim 32, wherein said at least one grid is irregular.

36. The method of claim 35, wherein the structure of said computer storage is based on a quadtree.

37. The method of claim 29, wherein said updating step comprises:
performing a depth comparison test between data associated with each of said identified cell or cells with said stored data in an element of said computer storage, wherein said element is the one associated with said cell; and
if said test indicates that update is necessary for said cell, writing said data associated with said cell into said associated element.

38. The method of claim 37, wherein the data to be compared with said stored data is related to the depth of one of said 3-D surfaces or one of said sub-elements of said 3-D surfaces, wherein the projection region or the extent of projection region of said one of said 3-D surfaces or said one of said sub-elements of said 3-D surfaces is related to said cell.

39. The method of claim 37, wherein the data to be compared with said stored data is related to the shortest depth of said 3-D surface or said sub-element.

40. The method of claim 37, wherein the data to be compared with said stored data is related to the largest depth of said 3-D surface or said sub-element.

41. The method of claim 37, wherein the data to be compared with said stored data is related to the bounding volume associated with said 3-D surface or said sub-element.

42. The method of claim 41, where at least one of said bounding volume is a volume containing a 3-D surface, or a volume containing a 3-D surface and at least one of the sub-elements of said 3-D surface.

43. The method of claim 41, wherein at least one of said bounding volumes defines a space containing all likely occurrence of said 3-D surface, or said 3-D surface and at least one of said sub-elements.

44. The method of claim 29, wherein said computer storage is accelerated by cache memory.

45. A method of reducing visibility computations in 3-D computer graphics, the method comprising:
computing the visibility of a set of entities selected from 3-D surfaces and sub-elements of said 3-D surfaces from the perspective of a group of at least one viewpoint, wherein said computing step comprises at least a comparison between a pair of depth-related numbers to determine which of the surfaces or the sub-elements of the surfaces associated with said numbers is closer to said group of at least one viewpoint and said 3-D surfaces are arranged in a hierarchy represented by patches in varying levels of details; and
skipping at least an occlusion relationship calculation at each of subsequent step or steps of visibility computations, wherein said visibility computations in each of said step or steps is from the perspective of each viewpoint from said group, or from the perspective of a subset of viewpoints from said group, for at least one entity that has been determined to be visible in said computing step.

46. A method of reducing visibility computations in 3-D computer graphics, the method comprising:
computing the visibility of a set of entities selected from 3-D surfaces and sub-elements of said 3-D surfaces from the perspective of a group of at least one viewpoint, wherein said computing step comprises:
employing at least one projection plane for generating projections with said selected set of 3-D surfaces and said sub-elements with respect to said perspective of a group of at least one viewpoint;
identifying regions on said at least one projection plane; wherein said regions are related to the projections associated with said 3-D surfaces, said sub-elements, or bounding volumes of said 3-D surfaces or said sub-elements from said perspective;
updating the data related to said regions in computer storage; and
deriving the visibility of at least one of said 3-D surfaces or said sub-elements from the data stored in said computer storage, and
skipping at least an occlusion relationship calculation at each of subsequent step or steps of visibility computations, wherein said visibility computations in each of said step or steps is from the perspective of each viewpoint from said group, or from the perspective of a subset of viewpoints from said group, for at least one entity that has been determined to be visible in said computing step.

47. The method of claim 46, wherein at least one of said bounding volumes is a volume containing a 3-D surface, or a volume containing a 3-D surface and at least one of the sub-elements of said 3-D surface.

48. The method of claim 46, wherein at least one of said bounding volumes defines a space containing all likely occurrence of said 3-D surface, or said 3-D surface and at least one of said sub-elements.

49. The method of claim 46, wherein said identifying step comprises:
dividing each projection plane into at least one grid; and
identifying the cell or cells of said at least one grid which are related to each of said regions or extents of said regions.

50. The method of claim 49, wherein said at least one grid is regular.

51. The method of claim 50, wherein the structure of said computer storage is based on a z-buffer.

52. The method of claim 49, wherein said at least one grid is irregular.

53. The method of claim 52, wherein the structure of said computer storage is based on a quadtree.

54. The method of claim 46, wherein said updating step comprises:
performing a depth comparison test between data associated with each of said identified cell or cells with said stored data in an element of said computer storage, wherein said element is the one associated with said cell; and
if said test indicates that update is necessary for said cell, writing said data associated with said cell into said associated element.

55. The method of claim 46, wherein said computer storage is accelerated by cache memory.

56. A method of reducing visibility computations in 3-D computer graphics with respect to a viewpoint, the method comprising:
  employing at least one projection plane for generating projections with respect to a perspective of said viewpoint;
  dividing said at least one projection plane into at least one grid, wherein said at least one grid is irregular;
  identifying, from said perspective, grid cells which are related to the projections or extents of the projections, said projections are related to 3-D surfaces, sub-elements of said 3-D surfaces, bounding volumes of said 3-D surfaces, or bounding volumes of said sub-elements, wherein said identified grid cells are represented by a data structure based on a quadtree;
  computing visibility of at least one of said surfaces or said sub-elements from said perspective, based on information derived from the identified grid cells; and
  ignoring, in a subsequent step of visibility computations, at least one of said 3-D surfaces or said sub-elements that has been determined to be invisible in said computing step, wherein said step is with respect to said perspective.

57. A method of reducing visibility computations in 3-D computer graphics with respect to a viewpoint, the method comprising:
  employing at least one projection plane for generating projections with respect to a perspective of said viewpoint;
  dividing said at least one projection plane into at least one grid; wherein said at least one grid is regular;
  identifying, from said perspective, grid cells which are related to the projections or extents of the projections; said projections are related to 3-D surfaces, sub-elements of said 3-D surfaces, bounding volumes of said 3-D surfaces, or bounding volumes of said sub-elements, wherein said identified grid cells are represented by a data structure based on a z-buffer;
  computing visibility of at least one of said surfaces or said sub-elements from said perspective, based on information derived from the identified grid cells; and
  ignoring, in a subsequent step of visibility computations, at least one of said 3-D surfaces or said sub-elements that has been determined to be invisible in said computing step; wherein said step is with respect to said perspective.

58. The method of claim 57 further comprising, after the step of identifying grid cells, updating data related to said 3-D surfaces or said sub-elements in a computer storage related to said identified grid cells.

59. The method of claim 58, wherein the data to be compared with the data of said computer storage are related to the depths of said 3-D surfaces or said sub-elements.

60. The method of claim 56, wherein the data to be compared with the data of said computer storage are related to the shortest depths of said 3-D surfaces or said sub-elements.

61. The method of claim 58, wherein the data to be compared with the data of said computer storage are related to the largest depths of said 3-D surfaces or said sub-elements.

62. The method of claim 58, wherein at least some of the data to be compared with the data of said computer storage are related to the bounding volumes of said 3-D surfaces or said sub-elements.

63. The method of claim 58, wherein the computer storage is accelerated by cache memory.

64. A method of reducing the visibility related computations in 3-D computer graphics, said visibility related computations being performed on 3-D surfaces or their sub-elements, or a selected set of both, said visibility related computations is from the perspective of a viewpoint, the method comprising:
  prior to a visibility computation, identifying grid cells which are under or related to at least one projection or at least one extent of projection that is associated with at least one of said 3-D surfaces or their sub-elements, said at least one projection or at least one extent of projection is from the perspective of said viewpoint;
  comparing the data associated with at least one of said 3-D surfaces, their sub-elements, bounding volumes of said 3-D surfaces, or bounding volumes of said sub-elements with the stored data associated with the grid cells;
  determining which of said at least one of said 3-D surfaces, or sub-elements is invisible to said viewpoint; and
  if said at last one of said 3-D surfaces or sub-elements is determined to be invisible to said viewpoint, ignoring the entity or entities during said visibility computation.

65. A method in 3-D computer graphics for processing the visibility of 3-D surfaces before a subsequent step of visibility computations, said method comprising:
  for each selected 3-D surface or sub-element of a 3-D surface, identifying grid cells on a projection plane which are under or related to a projection associated with said selected 3-D surface or sub-element, said projection and said subsequent step of visibility computations are from the perspective of a same viewpoint;
  for each of said grid cells, accessing the corresponding z-buffer element; and
  computing the visibility of the part of said selected 3-D surface or sub-element that projects onto said each of said grid cells by comparing the depth-related data stored in said corresponding z-buffer element with the depth-related value associated with said part.

66. The method of claim 65, further includes the step of using the visibility information computed for said selected 3-D surface or sub-element to reduce the computation for said selected 3-D surface or sub-element in said subsequent step of visibility computations.

67. A method in 3-D computer graphics for processing the visibility of 3-D surfaces before a subsequent step of visibility computations, said method comprising:
  for each selected 3-D surface or sub-element of a 3-D surface, identifying grid cells on a projection plane which are under or related to a projection associated with the bounding volume of said selected 3-D surface or sub-element, said projection and said subsequent step of visibility computations are from the perspective of a same viewpoint;
  for each of said grid cells, accessing the corresponding z-buffer element; and
  computing the visibility of the part of the bounding volume that projects onto said each of said grid cells by comparing the depth-related data stored in said corresponding z-buffer element with the depth-related value associated with said part.

68. The method of claim 67, fixer includes the step of using the visibility information computed for said selected 3-D surface or sub-element to reduce the computation for said selected 3-D surface or sub-element in said subsequent step of visibility computations.

* * * * *

UNITED STATES PATENT AND TRADEMARK OFFICE
CERTIFICATE OF CORRECTION

PATENT NO. : 6,618,047 B1
DATED : September 9, 2003
INVENTOR(S) : Hong Lip Lim

It is certified that error appears in the above-identified patent and that said Letters Patent is hereby corrected as shown below:

Column 33,
Line 56, change "claim 56" to -- claim 58 --.

Signed and Sealed this

Twentieth Day of July, 2004

JON W. DUDAS
*Acting Director of the United States Patent and Trademark Office*

(12) INTER PARTES REVIEW CERTIFICATE (101st)
United States Patent
Lim

(10) Number: US 6,618,047 K1
(45) Certificate Issued: Sep. 15, 2015

(54) VISIBILITY CALCULATIONS FOR 3D COMPUTER GRAPHICS

(75) Inventor: Hong Lip Lim

(73) Assignee: FUZZYSHARP TECHNOLOGIES INC.

Trial Number:

IPR2014-00001 filed Oct. 1, 2013

Petitioner: Intel Corporation

Patent Owner: Fuzzysharp Technologies, Inc.

Inter Partes Review Certificate for:

Patent No.: 6,618,047
Issued: Sep. 9, 2003
Appl. No.: 09/490,288
Filed: Jan. 20, 2000

The results of IPR2014-00001 are reflected in this inter partes review certificate under 35 U.S.C. 318(b).

INTER PARTES REVIEW CERTIFICATE
U.S. Patent 6,618,047 K1
Trial No. IPR2014-00001
Certificate Issued Sep. 15, 2015

AS A RESULT OF THE INTER PARTES REVIEW PROCEEDING, IT HAS BEEN DETERMINED THAT:

Claims 1, 8, 11-13, 46, 57, 64, 65 and 67 are cancelled.

* * * * *